(12) United States Patent
Takii

(10) Patent No.: US 11,271,512 B2
(45) Date of Patent: Mar. 8, 2022

(54) MOTOR DRIVING DEVICE

(71) Applicant: U-MHI PLATECH CO., LTD., Nagoya (JP)

(72) Inventor: Takashi Takii, Nagoya (JP)

(73) Assignee: U-MHI PLATECH CO., LTD., Aichi (JP)

( * ) Notice: Subject to any disclaimer, the term of this patent is extended or adjusted under 35 U.S.C. 154(b) by 36 days.

(21) Appl. No.: 16/962,829

(22) PCT Filed: Jun. 7, 2019

(86) PCT No.: PCT/JP2019/022729
§ 371 (c)(1),
(2) Date: Jul. 16, 2020

(87) PCT Pub. No.: WO2020/246021
PCT Pub. Date: Dec. 10, 2020

(65) Prior Publication Data
US 2021/0408956 A1 Dec. 30, 2021

(51) Int. Cl.
*H02M 7/44* (2006.01)
*H02P 27/06* (2006.01)
*H02P 5/74* (2006.01)

(52) U.S. Cl.
CPC .............. *H02P 27/06* (2013.01); *H02P 5/74* (2013.01)

(58) Field of Classification Search
CPC .................................... H02P 27/06; H02P 5/74
See application file for complete search history.

(56) References Cited

U.S. PATENT DOCUMENTS

| | | | | |
|---|---|---|---|---|
| 6,486,632 | B2 * | 11/2002 | Okushima | H02M 7/48 318/599 |
| 2010/0071970 | A1 | 3/2010 | Welchko et al. | |
| 2010/0097023 | A1 | 4/2010 | Nakamura et al. | |
| 2015/0349626 | A1 * | 12/2015 | Jiang | H02M 7/44 363/39 |

FOREIGN PATENT DOCUMENTS

| EP | 3654523 A1 | 9/2018 |
|---|---|---|
| JP | H1118487 A | 1/1999 |

(Continued)

OTHER PUBLICATIONS

Supplementary European Search Report for Eurpean application No. 19 90 8086 dated Feb. 5, 2021.

(Continued)

*Primary Examiner* — Cortez M Cook
(74) *Attorney, Agent, or Firm* — Pearne & Gordon LLP

(57) ABSTRACT

A motor driving device includes: a first motor and a second motor; a first power line for supplying driving power to the first motor; a second power line for supplying driving power to the second motor; a first inverter circuit configured to supply the driving power to the first power line; a second inverter circuit configured to supply the driving power to the second power line; transmission lines including a pair of a U-phase line and a U'-phase line, a pair of a V-phase line and a V'-phase line, and a pair of a W-phase line and a W'-phase line; and an impedance circuit impedance-matched to the transmission lines. Each of the transmission lines is arranged via an insulator.

17 Claims, 21 Drawing Sheets

(56) References Cited

FOREIGN PATENT DOCUMENTS

| | | | |
|---|---|---|---|
| JP | 2007-020355 | A | 1/2007 |
| JP | 2008-283755 | A | 11/2008 |
| JP | 2008283755 | A * | 11/2008 |
| JP | 2009-290989 | A | 12/2009 |
| JP | 2011-188550 | A | 9/2011 |
| JP | 6469332 | B1 | 2/2019 |
| WO | 2008/041708 | A1 | 4/2008 |
| WO | 2009/087915 | A1 | 7/2009 |
| WO | 2018/073909 | A1 | 4/2018 |

OTHER PUBLICATIONS

International Search Report for PCT/JP2019/022729 dated Jul. 30, 2019.

* cited by examiner

FIG. 13

MOTOR DRIVING DEVICE

This is the National Stage of PCT international application PCT/JP2019/022729 filed on Jun. 7, 2019, the content of which is incorporated herein by reference in its entirety.

TECHNICAL FIELD

The present invention relates to a motor driving device that controls driving of a motor using an inverter.

BACKGROUND ART

For example, driving of a plurality of servomotors for moving back and forth a screw of an injection device and a plurality of servomotors for opening and closing a clamping device is controlled by a motor driving device including an inverter. In a motor system driven by an inverter, a switching element provided in the inverter controls an output voltage waveform and supplies power to a servomotor through a cable.

Patent Literature 1 proposes a surge suppressing circuit connected to a receiving end of a motor, to which power is supplied from a multilevel inverter through a cable. The surge suppressing circuit includes a series circuit in which a first resistance and a first capacitor are connected in series, a value of the first resistance being set to reduce reflection due to impedance mismatching at the receiving end of the motor. One end of the series circuit is connected to the receiving end of the motor, and the other end of the series circuit is connected to a neutral point of DC voltage of the multilevel inverter. The connection herein refers to electrical connection.

CITATION LIST

Patent Literature

Patent Literature 1: JP 2008-283755 A

SUMMARY OF INVENTION

Technical Problem

If ideal conditions are met, the proposal in Patent Literature 1 can suppress surge for a symmetrical component of surge voltage and also for a zero-phase-sequence component of the surge voltage, and further suppress leakage current, which has passed through the surge suppressing circuit, flowing to ground, thereby reducing leakage current.

In Patent Literature 1, characteristic impedances of a U-phase line, a V-phase line, and a W-phase line of a cable 14 are matched to impedance values of RN1, RN2, and RN3 in the surge suppressing circuit. Patent Literature 1 has an object to achieve impedance matching to prevent reflection of current and voltage and reduce leakage current. However, applying Patent Literature 1 to an actual electrical circuit may have problems described below. The impedance matching in Patent Literature 1 refers to make same value between the characteristic impedances of the lines (U-phase line, V-phase line, and W-phase line) and impedances of the load circuit (surge suppressing circuit) connected to ends of the lines.

When electricity propagates through a transmission line, voltage and current have a certain ratio, which is generally referred to as a characteristic impedance.

Problem 1: Generally, for a single wire cable, an electric or magnetic field is developed radially of a single wire. If there is no conductor, magnetic material, or dielectric material as an electric or magnetic shield around the cable, an electric or magnetic line of force propagating radially of the cable spreads infinitely. Also, a characteristic impedance of the single wire cable varies when the electric or magnetic line of force it generates is inhibited or absorbed.

Thus, determining cable inductance and cable capacitance as main parameters for determining the characteristic impedance of the single wire cable requires consideration of an influence of a surrounding conductor, magnetic material, or dielectric material within a radial range, which is relatively larger than a radius of the cable, along an extending direction of the cable. Thus, in Patent Literature 1 including no measures against an influence of a surrounding conductor, magnetic material, or dielectric material, it is difficult to previously determine characteristic impedance values of the U-phase line, the V-phase line, and the W-phase line of the cable 14. Also in Patent Literature 1, by the influence of arrangement of the surrounding conductor, magnetic material, or dielectric material according to a laying state of the cable, the characteristic impedance values may vary, which causes indeterminate impedance matching for reflection prevention.

Problem 2: Further, unless the conductor, the magnetic material, or the dielectric material around the cable 14 uniformly influences the U-phase line, the V-phase line, and the W-phase line, the characteristic impedances of the U-phase line, the V-phase line, and the W-phase line may not uniformly vary. In this case, the characteristic impedances of the U-phase line, the V-phase line, and the W-phase line are different, and it is difficult to determine the individual impedance values, which may cause unstable impedance matching for reflection prevention.

Problem 3: Existence of the conductor, the magnetic material, or the dielectric material around the U-phase line, the V-phase line, and the W-phase line of the cable 14 refers to existence of ground stray capacitance. If voltage and current propagate through the U-phase line, the V-phase line, and the W-phase line of the cable 14, the voltage and current are partially charged into and discharged from the ground stray capacitance. Of course, zero-phase-sequence voltage and current are also partially charged into and discharged from the ground stray capacitance. The ground stray capacitance and the surge suppressing circuit are parallel to each other, and the voltage and current flowing through the ground stray capacitance partially bypass the surge suppressing circuit. Specifically, an effect of the surge suppressing circuit is not sufficiently exerted, and reflection of the zero-phase-sequence voltage and current cannot be prevented.

From the above, an object of the present invention is to provide a motor driving device including an inverter that can achieve impedance matching to prevent reflection of current and voltage even when being influenced by a surrounding conductor, magnetic material, or dielectric material.

Solution to Problem

An motor driving device according to the present invention includes: a first motor and a second motor driven by three-phase AC power; a first power line including a U-phase line, a V-phase line, and a W-phase line for supplying driving power to the first motor; and a second power line including a U'-phase line, a V'-phase line, and a W'-phase line for supplying driving power to the second motor.

The motor driving device according to the present invention further includes: a first inverter circuit configured to supply the driving power to the first power line; and a second inverter circuit configured to supply the driving power to the second power line.

The motor driving device according to the present invention further includes: transmission lines including a pair of the U-phase line and the U'-phase line, a pair of the V-phase line and the V'-phase line, and a pair of the W-phase line and the W'-phase line; and an impedance circuit impedance-matched to the transmission lines. Each of the transmission lines is arranged via an insulator.

In the motor driving device of the present invention, the first inverter circuit and the second inverter circuit preferably perform control to apply voltages of opposite phases to each of the pair of the U-phase line and the U'-phase line, the pair of the V-phase line and the V'-phase line, and the pair of the W-phase line and the W'-phase line to pass currents in opposite directions through each of the pair of the U-phase line and the U'-phase line, the pair of the V-phase line and the V'-phase line, and the pair of the W-phase line and the W'-phase line, and to synchronously drive the first motor and the second motor.

The impedance circuit in the present invention is preferably provided between a first neutral point of the first motor and a second neutral point of the second motor.

In the present invention, in a section connecting receiving each end of the first motor and the second motor and the transmission lines, the impedance circuit is preferably provided to connect corresponding phases of the transmission lines.

In the motor driving device of the present invention, a first drive shaft of the first motor and a second drive shaft of the second motor are preferably shared.

The motor driving device of the present invention preferably further includes, as a loss reduction circuit, one or both of a rejection filter connected in series to the impedance circuit and a bypass filter connected in parallel to the impedance circuit.

The motor driving device of the present invention preferably further includes one or both of the rejection filter including a capacitor and an inductor connected in parallel and the bypass filter including the capacitor and the inductor connected in series.

In the motor driving device of the present invention, in one or both of the rejection filter and the bypass filter, an inductor and a bidirectional switch are preferably connected in series.

The motor driving device of the present invention preferably further includes a plurality of the loss reduction circuits having different characteristics corresponding to a plurality of the impedance circuits.

In the motor driving device of the present invention, preferably, neutral lines connected to the first neutral point of the first motor and the second neutral point of the second motor and extended from the first neutral point and the second neutral point form the transmission lines, and the impedance circuit is provided in the transmission lines.

The motor driving device of the present invention preferably further includes: a main path including the transmission lines connecting the first inverter circuit and the first motor, and the transmission lines connecting the second inverter circuit and the second motor, and a sub-path including the transmission lines branching off from the main path, and the impedance circuit is provided in the sub-path.

Advantageous Effects of Invention

According to the motor driving device of the present invention, among the U-phase line, the V-phase line, and the W-phase line that form the first power line, and the U'-phase line, the V'-phase line, and the W'-phase line that form the second power line, the pair of the U-phase line and the U'-phase line, the pair of the V-phase line and the V'-phase line, and the pair of the W-phase line and the W'-phase line form the transmission lines. In the present invention, the impedance circuit is connected to the transmission lines, and thus stable impedance matching can be achieved even when being influenced by a surrounding conductor or the like, thereby preventing reflection of current and voltage. In particular, the transmission lines in the present invention can be applied to the power lines, through which large current flows to generate a strong electric or magnetic field there around and thus which are electrically or magnetically influenced by their surroundings to cause large variations of characteristic impedances, thereby allowing easy and highly accurate impedance matching and effectively preventing reflection.

BRIEF DESCRIPTION OF DRAWINGS

FIG. 13 is a block diagram of another motor driving device according to Embodiment 8 of the present invention.

DESCRIPTION OF EMBODIMENTS

Now, with reference to the drawings, a motor driving device of the present invention will be described based on preferred embodiments.

Embodiment 1

First, Embodiment 1 of the present invention will be described. Embodiment 1 includes Embodiment 1-1 and Embodiment 1-2. In the description, balanced line are taken as an example of transmission lines. In the balanced line, lines forming a first power line 41 and a second power line 42 and through which a phase AC current flows are paired and arranged adjacent to each other via an insulator. Circuit configurations in Embodiment 1-1 and Embodiment 1-2 are the same except that positions at which an impedance circuit 51 is directly or indirectly connected to transmission lines 44u, 44v, 44w are different. Thus, an overall circuit configuration in Embodiment 1-1 will be first described, and then Embodiment 1-2 will be described mainly on differences from Embodiment 1-1.

Embodiment 1-1

A motor driving device 10 according to Embodiment 1-1 converts AC current output from a three-phase AC power source to DC current, and further converts the converted DC current to the AC current and supplies the AC current to the three-phase AC motor. In this embodiment, the three-phase AC motor is a servomotor, but the three-phase AC motor in the present invention is not limited to the servomotor. The present invention is applicable to, for example, three-phase AC motors such as induction motors, synchronous motors, permanent magnet (PM) motors which can be driven by an inverter circuit; actuators; and generators.

[Overall Configuration]

Figure 1:
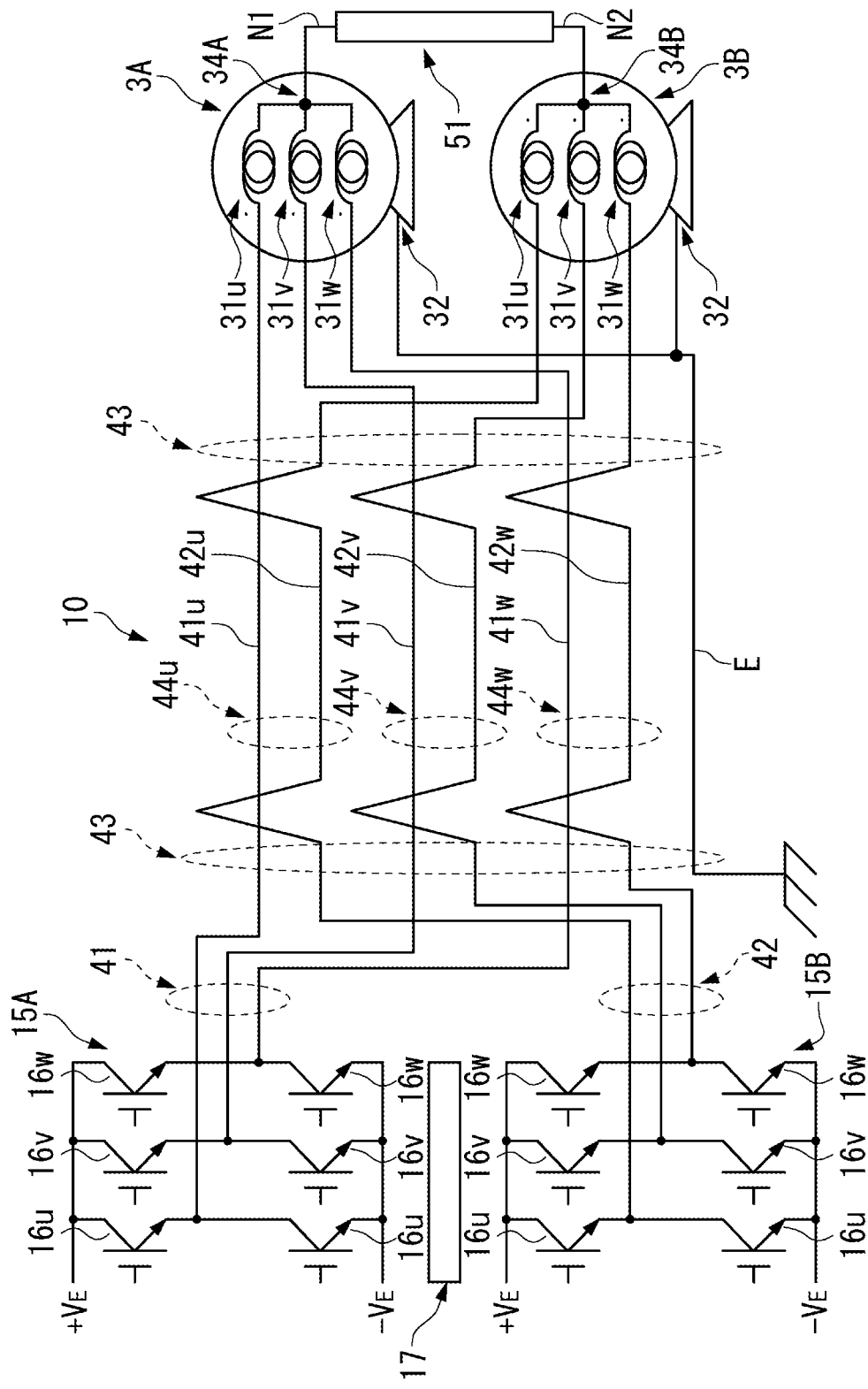
FIG. 1 is a block diagram of a motor driving device according to Embodiment 1-1 of the present invention.

As shown in FIG. 1, the driving device 10 according to Embodiment 1-1 includes a first motor 3A and a second motor 3B, and a first inverter circuit 15A and a second inverter circuit 15B corresponding to the first motor 3A and the second motor 3B, respectively. Hereinafter, when there is no need to differentiate between the first motor 3A and the second motor 3B, they are simply referred to as motor 3, and when there is a need to differentiate therebetween, the descriptions of the first motor 3A and the second motor 3B are used. The same applies to the first inverter circuit 15A and the second inverter circuit 15B and other components.

In FIG. 1, reference numeral 43 denotes a multicore cable including a plurality of wires surrounded by dashed ellipses. The multicore cable forms an area between two positions denoted by reference numeral 43. The same applies to FIGS. 8, 9, and the like.

The inverter circuit 15 receives DC current to drive the motor 3. The DC current is generally supplied from a converter, which converts AC current output from the three-phase AC power source to DC current. Thus, in this embodiment, devices such as a converter and a smoothing capacitor can be provided between the inverter circuit 15 and a power source.

The driving device 10 includes an inverter control unit 17 that controls the inverter circuit 15. The inverter control unit 17 controls ON and OFF of semiconductor switching elements 16u, 16v, 16w that constitute the inverter circuit 15. In FIG. 1, the single inverter control unit 17 controls both the first inverter circuit 15A and the second inverter circuit 15B, but an inverter control unit corresponding to the first inverter circuit 15A and an inverter control unit corresponding to the second inverter circuit 15B may be provided.

The inverter control unit 17 controls ON and OFF of the semiconductor switching elements 16u, 16v, 16w that constitute the first inverter circuit 15A and the second inverter circuit 15B so as to supply AC currents of opposite phases to the first motor 3A and the second motor 3B.

The inverter control unit 17 detects current of the motor 3, and detects voltage of a smoothing capacitor, if any, and controls ON and OFF of the semiconductor switching elements 16u, 16v, 16w.

The inverter control unit 17 synchronously controls operations of the first motor 3A and the second motor 3B.

[Motor 3]

The motor 3 is a three-phase AC servomotor, and as shown in FIG. 1, includes three coils 31u, 31v, 31w constituted by windings, and a stator 32 constituted by a conductor around which the coils 31u, 31v, 31w are wound. In addition to the coils 31u, 31v, 31w and the stator 32, the motor 3 includes a rotor rotatably provided inside the stator 32, and the like, which are not shown in FIG. 1. The same applies to Embodiment 2 and thereafter. The rotor may be constituted by a permanent magnet, a coil, or a squirrel-cage.

The first motor 3A and the second motor 3B have the same specifications, and the operations thereof are synchronously controlled. The first motor 3A and the second motor 3B are electrically conducted through the stator 32 of the first motor 3A and the stator 32 of the second motor 3B. In FIG. 1, a conductor that electrically conducts the stator 32 of the first motor 3A and the stator 32 of the second motor 3B is grounded by a ground wire E as an example. However, in this embodiment, there is no need for grounding when preventing external emission of noise generated by switching ON and OFF of the semiconductor switching elements 16u, 16v, 16w.

The first motor 3A and the second motor 3B are connected to an impedance circuit 51 via first neutral point 34A and a second neutral point 34B at which the three coils 31u, 31v, 31w meet.

[Inverter Circuit 15 (15A, 15B)]

As shown in FIG. 1, the inverter circuit 15 includes the semiconductor switching elements 16u, 16v, 16W corresponding to the u-phase, v-phase, w-phase coils 31u, 31v, 31w, respectively, provided in the motor 3. The inverter circuit 15 includes the semiconductor switching elements 16u, 16v, 16w each in pairs, that is, the semiconductor switching elements 16u, 16v, 16w arranged on an upper side and the semiconductor switching elements 16u, 16v, 16w arranged on a lower side in FIG. 1.

The inverter circuit 15 supplies, as inverter circuit output, driving current generated by switching, that is, controlling ON and OFF of the semiconductor switching elements 16u, 16v, 16W to the coils 31u, 31v, 31w.

The semiconductor switching elements 16u, 16v, 16w may be insulated gate bipolar transistors (IGBT), metal-oxide-semiconductor field-effect transistors (MOSFET), or other semiconductor elements.

[Inverter Control Unit 17]

The inverter control unit 17 controls ON and OFF of the semiconductor switching elements 16u, 16v, 16w that constitute the first inverter circuit 15A and the second inverter circuit 15B. Through the control, the first inverter circuit 15A and the second inverter circuit 15B synchronously control the first motor 3A and the second motor 3B.

The inverter control unit 17 controls ON and OFF of the semiconductor switching elements 16u, 16v, 16w so as to supply currents of opposite phases to the first motor 3A and the second motor 3B. This is achieved by delaying or advancing, by a phase of a half cycle, a cycle of switching of one of the first inverter circuit 15A and the second inverter circuit 15B by the inverter control unit 17 from a cycle of switching of the other of the first inverter circuit 15A and the second inverter circuit 15B.

[First Power Line 41 and Second Power Line 42]

The driving device 10 includes the first power line 41 connecting the first inverter circuit 15A and the first motor 3A for supplying driving power to the first motor 3A, and the second power line 42 connecting the second inverter circuit 15B and the second motor 3B for supplying driving power to the second motor 3B.

The first power line 41 includes a U-phase line 41u, a V-phase line 41v, and a W-phase line 41w corresponding to the semiconductor switching elements 16u, 16v, 16w, respectively, of the first inverter circuit 15A. The second power line 42 includes a U'-phase line 42u, a V'-phase line 42v, and a W'-phase line 42w corresponding to the semiconductor switching elements 16u, 16v, 16w, respectively, of the second inverter circuit 15B.

[Balanced Line 44u, 44v, 44w]

In the driving device 10, the first power line 41 and the second power line 42 form balanced line 44u, 44v, 44w. The balanced line 44u include a pair of the U-phase line 41u and the U'-phase line 42u of the corresponding phase. The balanced line 44v include a pair of the V-phase line 41v and the V'-phase line 42v of the corresponding phase. The balanced line 44w include a pair of the W-phase line 41w and the W'-phase line 42w of the corresponding phase.

[Impedance Circuit 51]

The driving device 10 includes the impedance circuit 51 connecting the first motor 3A and the second motor 3B. The impedance circuit 51 is impedance-matched to the balanced line 44u, 44v, 44w. Impedance matching refers to matching an output impedance value of a feeding-side circuit and an input impedance value of a receiving-side circuit. In the driving device 10, the feeding-side circuit corresponds to the balanced line 44u, 44v, 44w and the receiving-side circuit corresponds to the impedance circuit 51.

The impedance circuit 51 is connected to the first neutral point 34A of the first motor 3A via a first neutral line N1, and connected to the second neutral point 34B of the second motor 3B via a second neutral line N2. As such, the impedance circuit 51 is indirectly connected to the balanced line 44u, 44v, 44w.

[Driving of Driving Device 10]

Next, control to synchronously drive the first motor 3A and the second motor 3B will be briefly described.

In this embodiment, there is a phase difference of a half cycle, that is, 180° (degree) between switching of the first inverter circuit 15A and switching of the second inverter circuit 15B. Thus, voltages of opposite phases, that is, voltages having 180° different phases are applied to each of the pair of the U-phase line 41u and the U'-phase line 42u, the pair of the V-phase line 41v and the V'-phase line 42v, and the pair of the W-phase line 41w and the W'-phase line 42w. Thus, currents in opposite directions flow through each of the pair of the U-phase line 41u and the U'-phase line 42u, the pair of the V-phase line 41v and the V'-phase line 42v, and the pair of the W-phase line 41w and the W'-phase line 42w. Thus, the first motor 3A and the second motor 3B are synchronously driven by receiving AC currents of opposite phases.

[Effects]

Next, effects of the driving device 10 according to Embodiment 1-1 will be described.

[Effects of Balanced Line 44u, 44v, 44w]

The driving device 10 includes the first power line 41 and the second power line 42 forming the balanced line 44u, 44v, 44w, and thus stable impedance matching can be easily achieved as described below.

For the balanced line in this embodiment, one line is provided adjacent to the other line, and equal currents in opposite directions are passed through the lines. Thus, one and the other lines of the balanced line are electrically or magnetically superior to surrounding space, and electric and magnetic lines of force generated from one line are absorbed by the other line. In particular, when equal currents of opposite phases in opposite directions flow through one and the other lines, electric and magnetic lines of force generated from one line and electric and magnetic lines of force generated from the other line are equal and in opposite directions. Thus, the electric and magnetic lines of force between the one and the other lines are in the same direction and strengthen each other. However, the electric and magnetic lines of force away from the one and the other lines, that is, away from the balanced line 44u, 44v, 44w are in opposite directions, and weaken electric and magnetic fields generated. Thus, electromagnetic influences from the surroundings to the balanced line 44u, 44v, 44w and from the balanced line 44u, 44v, 44w to the surroundings are negligibly small.

Then, in this embodiment, the U-phase line 41u and the U'-phase line 42u are paired, the V-phase line 41v and the V'-phase line 42v are paired, and the W-phase line 41w and the W'-phase line 42w are paired to form the balanced line for driving in opposite phases (opposite potentials). This can reduce electromagnetic influences from a conductor, a magnetic material, or a dielectric material that is not intended, if any, around the balanced line 44u, 44v, 44w, and allow characteristic impedance values of the balanced line 44u, 44v, 44w to fall within previously determined values. Thus, the driving device 10 can easily achieve stable impedance matching.

As described above, the electromagnetic influences from the surroundings to the balanced line 44u, 44v, 44w and from the balanced line 44u, 44v, 44w to the surroundings are negligibly small. Thus, the characteristic impedances of the balanced line 44u, 44v, 44w are determined only from materials and structures of insulators, materials, shapes, and structures of conductors, and a gap between conductors, which constitute the balanced line. Thus, the balanced line 44u, 44v, 44w can have the same characteristic impedance value. Also in this respect, the driving device 10 can easily achieve stable impedance matching.

[Reflection Preventing Effect by Impedance Matching Between Three-Phase Power Source Circuit and Motor]

In the driving device 10, all of three-phase currents may flow from the inverter circuit 15 on the feeding side toward the first motor 3A and the second motor 3B intentionally as when the motor is forced to stop or accidentally as in a case of common mode noise. In this case, the currents flowing into the neutral point 34 lose their ways. In response to this, impedances of the balanced line 44u, 44v, 44w on the input sides of the first motor 3A and the second motor 3B and an impedance of the impedance circuit 51 connecting the first neutral point 34A and the second neutral point 34B on the output side are matched.

Thus, the currents flowing into the neutral point 34 of one motor can flow to the neutral point 34 of the other motor without being reflected.

This can prevent reflection at the first neutral point 34A and the second neutral point 34B, and thus prevent overvoltage at the first neutral point 34A and the second neutral point 34B.

With this effect, particularly in a case of a zero-phase-sequence voltage, for example, when all of U-phase, V-phase, and W-phase voltages are the same positive or negative value, an uncertain voltage increase or decrease, which may cause surge voltage of up to twice as much as supply voltage of three phase driving currents, can be prevented. The surge voltage may cause an electrical shock between the first motor 3A and the second motor 3B and ground or between the first power line 41 and the second power line 42 and ground to cause breakdown or reduce life of insulation of motor windings due to partial discharge. This embodiment can prevent such defects and prevent uncertain overvoltage, which facilitates identification of maximum voltages on power supply sides of the first motor 3A and the second motor 3B and designs of the first power line 41 and the second power line 42. This can minimize withstand voltage margin of an electrical circuit, thereby downsizing a power source device, reducing insulating properties of rotor bearings of the first motor 3A and the second motor 3B, and reducing cost of the bearings.

In this embodiment, the U-phase line 41u and the U'-phase line 42u are paired, the V-phase line 41v and the V'-phase line 42v are paired, and the W-phase line 41w and the W'-phase line 42w are paired to drive the first motor 3A and the second motor 3B in opposite phases (opposite potentials). Zero-phase-sequence voltage and current of the U-phase line 41u, the V-phase line 41v, and the W-phase line 41w and zero-phase-sequence voltage and current of the U'-phase line 42u, the V'-phase line 42v, and the W'-phase line 42w are of opposite phases and cancelled out, and thus a total zero-phase-sequence potential is always negligibly small. Even with unintended ground stray capacitance, negligibly small amount of zero-phase-sequence voltage and current are charged into and discharged from the ground stray capacitance. The ground stray capacitance and the impedance circuit are parallel to each other, and thus negligibly small amount of zero-phase-sequence voltage and current being charged into and discharged from the ground stray capacitance means that most of the zero-phase-sequence voltage and current flow through the impedance circuit. Thus, the impedance circuit can sufficiently suppress the reflection without being affected by the zero-phase-sequence voltage and current.

As shown in FIG. 1, the impedance circuit 51 in this embodiment is not grounded. Thus, in this embodiment, even if reflection is not completely prevented and noise remains, the remaining noise does not leak out but stays within the first motor 3A and the second motor 3B and the driving circuits thereof, and does not influence external devices.

When the impedance circuit 51 in this embodiment is constituted by only a resistance, reflection at the first neutral point 34A and the second neutral point 34B can be prevented irrespective of frequency of the zero-phase-sequence current such as noise.

Simply by the fact that the first power line 41 of the first motor 3A and the second power line 42 of the second motor 3B form the balanced line 44u, 44v, 44w and that the currents of corresponding phases are passed there through in opposite phases, electromagnetic noise emitted from the balanced line 44u, 44v, 44w can be cancelled out and suppressed. This can simplify suppression of electromagnetic noise from the first power line 41 and the second power line 42.

Characteristic impedances of the three balanced line arranged in parallel in this embodiment can be identified as described below. For example, a characteristic impedance Rpu of the balanced line including the U-phase line 41u and the U'-phase line 42u is 100 ohms. A characteristic impedance Rpv of the balanced line including the V-phase line 41v and the V'-phase line 42v and a characteristic impedance Rpw of the balanced line including the W-phase line 41w and the W'-phase line 42w are also 100 ohms.

In this embodiment, the three balanced line: the pair of the U-phase line 41u and the U'-phase line 42u, the pair of the V-phase line 41v and the V'-phase line 42v, and the pair of the W-phase line 41w and the W'-phase line 42w arranged in parallel extend from the two driving devices to the two three-phase AC motors. Thus, a characteristic impedance Rp is a composite characteristic impedance of the three balanced line as described below:

$$Rp=(Rpu+Rpv+Rpw)/3=33.3 \text{ ohms}$$

Impedance matching in this case will be described below.

The receiving-side circuit at the first neutral point 34A and the second neutral point 34B is the impedance circuit 51, and an impedance (Rc) of the impedance circuit 51 is matched to the impedance of the feeding-side circuit.

For example, for a motor having a large capacity of several tens of kilowatts or more, a resistance value of a motor coil wire is, for example, about 0.1 ohms and is much smaller than the characteristic impedance of the balanced line so that heat generation can be suppressed when large current is passed. Thus, the resistance value can be ignored in impedance matching between the balanced line and the impedance circuit 51 connecting the first neutral point 34A and the second neutral point 34B in Embodiment 1-1.

In this case, the impedance matching can be achieved by equalizing the impedance Rc of the impedance circuit 51 to the characteristic impedance Rp/3 of the balanced line, that is, 33.3 ohms.

Embodiment 1-2

Next, Embodiment 1-2 of Embodiment 1 will be described.

In Embodiment 1-1, the impedance circuit 51 is connected to the first neutral point 34A of the first motor 3A by the first neutral line N1, and to the second neutral point 34B of the second motor 3B by the second neutral line N2, while in Embodiment 1-2, the impedance circuit 51 is provided in a different position. The motor driving device 10 of Embodiment 1-2 will be described mainly on differences from that of Embodiment 1-1.

Figure 2:
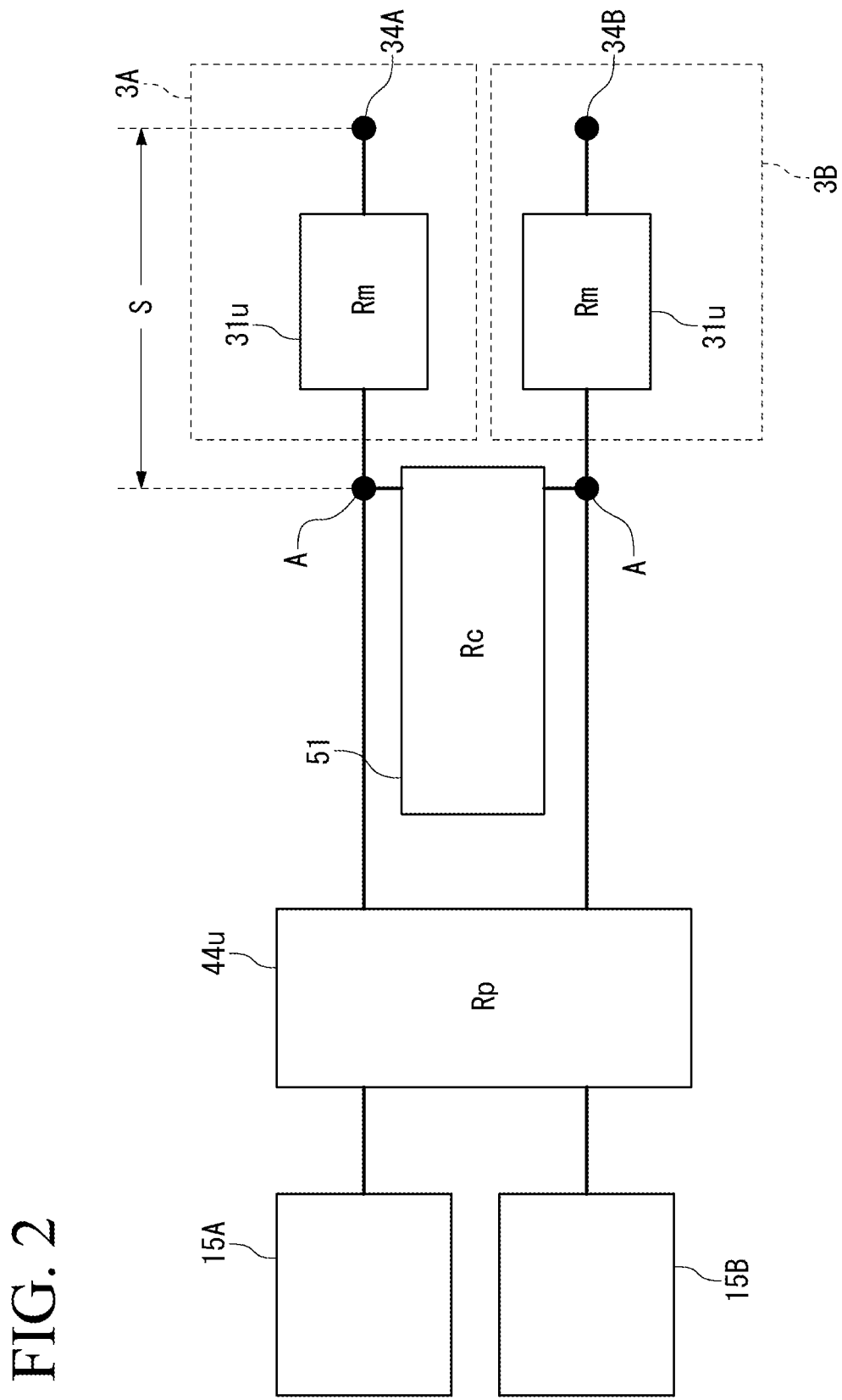
FIG. 2 is a block diagram of a motor driving device according to Embodiment 1-2 of the present invention.

In Embodiment 1-2, in a section connecting receiving ends A, A of the first motor 3A and the second motor 3B and the balanced line 44u, 44v, 44w, the impedance circuit 51 is provided to connect corresponding phases of the balanced line 44u, 44v, 44w between the motors 3. FIG. 2 shows an example in which the impedance circuit 51 is provided between the U-phase line 41u and the U'-phase line 42u. The U-phase line 41u is between the first inverter circuit 15A and the first motor 3A, and the U'-phase line 42*u* is between the second inverter circuit 15B and the second motor 3B.

Figure 3A:
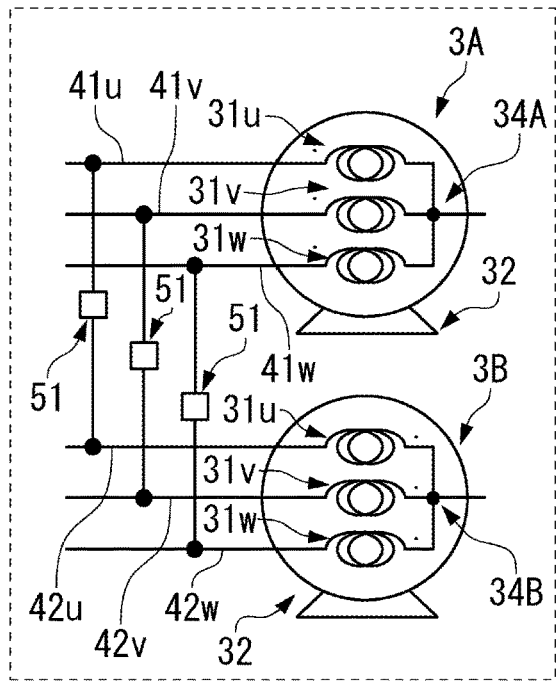
FIG. 3 is a block diagram of essential portions of the motor driving device according to Embodiment 1-2.
Figure 3B:
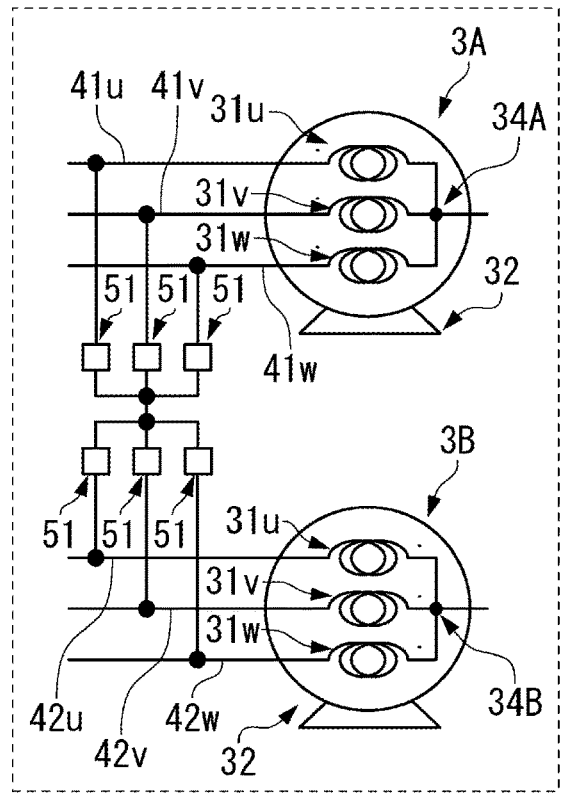
Figure 3C:
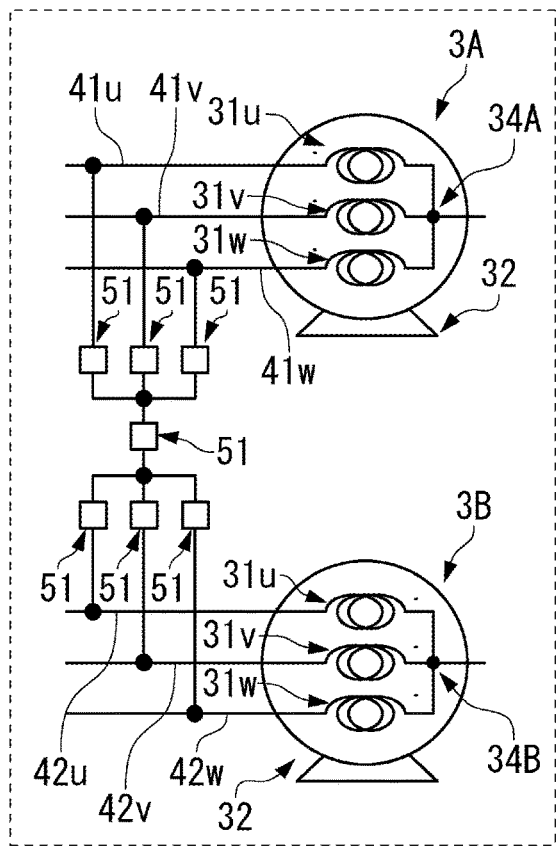

FIGS. 3A, 3B, and 3C show more specific examples in which the impedance circuits 51 are directly connected between the U-phase and the U'-phase, between the V-phase and the V'-phase, and between the W-phase and the W'-phase.

When capacities of the first motor 3A and the second motor 3B are, for example, several tens of kilowatts or more and large, the impedances of the coils 31*u*, 31*v*, 31*w* are, for example, about 0.1 ohms and very small, and the resistance values of the coils 31*u*, 31*v*, 31*w* can be ignored. Thus, the impedance circuit 51 connecting the first neutral point 34A and the second neutral point 34B as in Embodiment 1-1 can be impedance-matched to the balanced line 44*u*, 44*v*, 44*w*.

However, if the capacities of the first motor 3A and the second motor 3B are, for example, about 2 kilowatts or less and small, the resistance values of the coils 31*u*, 31*v*, 31*w* may be about several tens of ohms to 50 ohms. The resistance values overlap the characteristic impedances (several tens to hundreds of ohms) of the balanced line 44*u*, 44*v*, 44*w*, and thus the resistance values of the coil wires cannot be ignored in impedance matching in the balanced line 44*u*, 44*v*, 44*w* and the first neutral point 34A and the second neutral point 34B.

In Embodiment 1-2, the impedance circuits 51 are provided between the receiving ends A of the first motor 3A and the second motor 3B and the balanced line 44*u*, 44*v*, 44*w*, specifically, between the U-phase and the U'-phase, between the V-phase and the V'-phase, and between the W-phase and the W'-phase on the input sides of the first motor 3A and the second motor 3B. In Embodiment 1-2, the impedances of the coils 31*u*, 31*v*, 31*w* can be ignored, and thus a matching equation Rc=Rp needs only to be satisfied to achieve impedance matching. Specifically, the impedance Rc (ohms) of each impedance circuit 51 may be equal or nearly equal to the characteristic impedance Rp (ohms) of the balanced line 44*u*, 44*v*, 44*w*.

In Embodiment 1-2 in which the impedance circuits 51 are provided on the input sides of the first motor 3A and the second motor 3B, the impedance circuits 51 are connected to middles of the lines. Thus, as shown in FIG. 2, in the first motor 3A and the second motor 3B, there are short sections S, which include the coils 31*u*, 31*v*, 31*w* extending from the receiving ends A to the first neutral point 34A and the second neutral point 34B as terminations, the first neutral point 34A, the second neutral point 34B, and the like. In this case, when the first neutral point 34A and the second neutral point 34B as the terminations of the short sections S are open ends, or lines of different impedances are connected to the first neutral point 34A and the second neutral point 34B as the terminations, for example in Embodiment 1-2, reflection may occur at the first neutral point 34A and the second neutral point 34B.

It is assumed that distances from the receiving ends A to the first neutral point 34A and the second neutral point 34B are sufficiently smaller with respect to a wavelength of a potential propagating from the balanced line 44*u*, 44*v*, 44*w*. When the distances from the receiving ends A to the first neutral point 34A and the second neutral point 34B are, for example, about one tenth or shorter of the wavelength, potentials of the receiving ends A and the first neutral point 34A and the second neutral point 34B may have the same phase substantially simultaneously by an incident wave of the potential propagating from the balanced line 44*u*, 44*v*, 44*w*. Thus, two reflected waves generated at the receiving ends A and the first neutral point 34A and the second neutral point 34B also have the same phase simultaneously, and can be treated as one reflected wave reflected at one point without being differentiated. Thus, even with a plurality of different impedances in the short sections S, the reflected waves generated at connecting points of the impedances can be treated as the reflected waves at the receiving ends A without being differentiated. Thus, according to Embodiment 1-2, the reflection in the short sections S can be ignored, and impedance matching can be achieved without being influenced by impedance values in the short sections S. Generally, when a length of a line is about one fourth of a wavelength of an incident wave, reflection may occur in the line. When a length of each short section S is several meters or shorter, a frequency of current that may have wave nature in the short section is a superhigh frequency (50 MHz or higher), and usually, such superhigh frequency current is not generated in the short section in the three-phase AC motor.

For a reflection preventing method in Embodiment 1-2, the plurality of impedance circuits 51 are provided, which may make line connection and structures more complicated and may increase power loss as compared to Embodiment 1-1. However, Embodiment 1-2 has less or no restriction on the capacity, rating, size, and the like of the motor as compared to Embodiment 1-1, and can be advantageously applied to various motors.

Embodiment 2

Next, Embodiment 2 of the present invention will be described.

In Embodiment 2, drive shafts (first drive shaft and second drive shaft) of the first motor 3A and the second motor 3B in Embodiment 1-1 and Embodiment 1-2 of Embodiment 1 are shared. In this case, housings of the first motor 3A and the second motor 3B are also preferably shared. The motors are apparently integrated, and are thus referred to as motor 3.

The motor 3 preferably includes an even number of winding-set each of the stator and the rotor.

Figure 21:
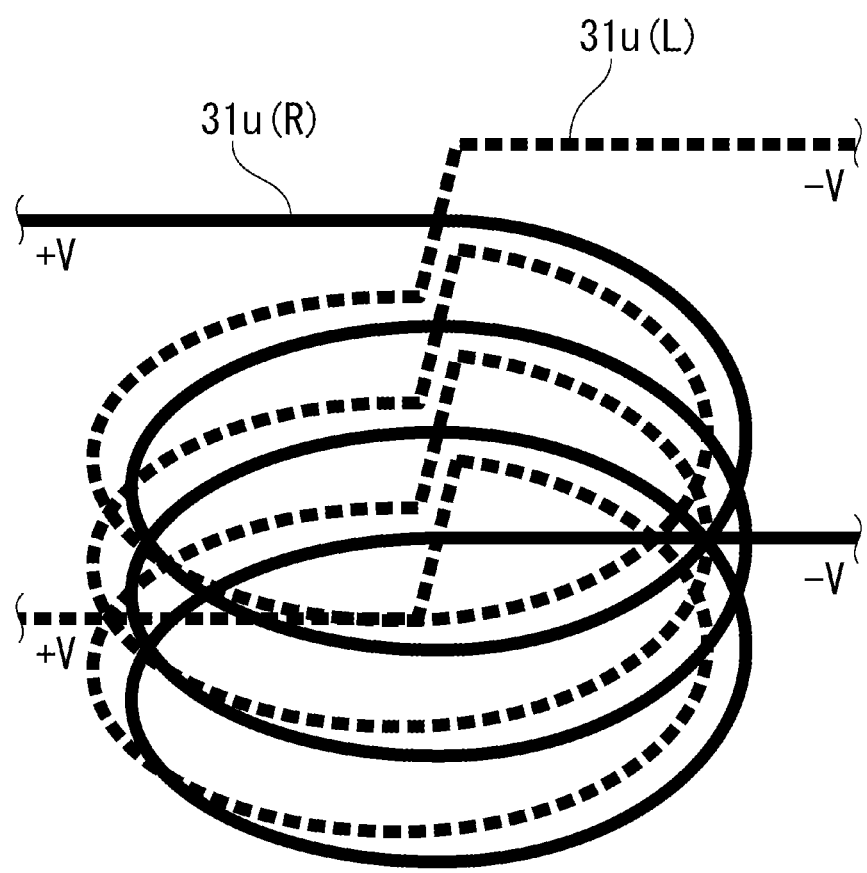
FIG. 21 is a perspective view of a preferred coil of a three-phase AC motor according to Embodiment 2 of the present invention.

Further, preferably, the three-phase coils 31*u*, 31*v*, 31*w* of the first motor 3A are first winding side coils, and the three-phase coils 31*u*, 31*v*, 31*w* of the second motor 3B are the second winding side coils. When the motor 3 is a dual winding motor with one coil 31 including two windings, as shown in FIG. 21, for example, one coil 31*u*(R) is right-handed and the other coil 31*u* is left-handed, and both the coils 31*u*(R), 31*u* are coaxially wound. The coil 31 may include multiple pairs of the right-handed and left-handed windings. In this case, adjacent windings are wound in opposite directions.

With the above configuration, in the compact and high-power motor 3 in which the plurality of coils drive the single drive shaft, the single three-phase AC motor can achieve the effects of the present invention without requiring a plurality of three-phase AC motors.

Embodiment 3

Next, with reference to FIGS. 4 and 5, Embodiment 3 of the present invention will be described.

In Embodiment 3, the impedance circuit 51 connecting the first neutral point 34A and the second neutral point 34B in Embodiment 1-1 of Embodiment 1 includes a loss reduction circuit. The loss reduction circuit may include one or both of a rejection filter and a bypass filter.

In Embodiment 3, an example of application to the impedance circuit 51 in Embodiment 1-1 of Embodiment 2 is described, but application to the impedance circuit 51 in Embodiment 1-2 of Embodiment 1 is acceptable.

The loss reduction circuit in Embodiment 3 includes one or both of a capacitor and an inductor. The capacitor may be a device that can be charged or discharged such as an electric double layer capacitor using an electric double layer or a pseudocapacitor. The inductor is not limited to a coil, but may be a device in which an induction voltage is generated by changing current, such as an inductor with conductor metal printed on a sheet or a substrate.

Figure 4A:
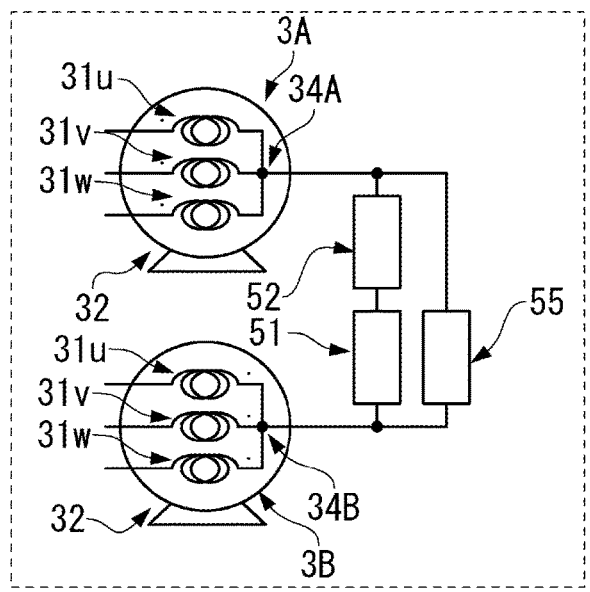
FIG. 4 is a block diagram of a rejection filter of a motor driving device according to Embodiment 3 of the present invention.
Figure 4B:
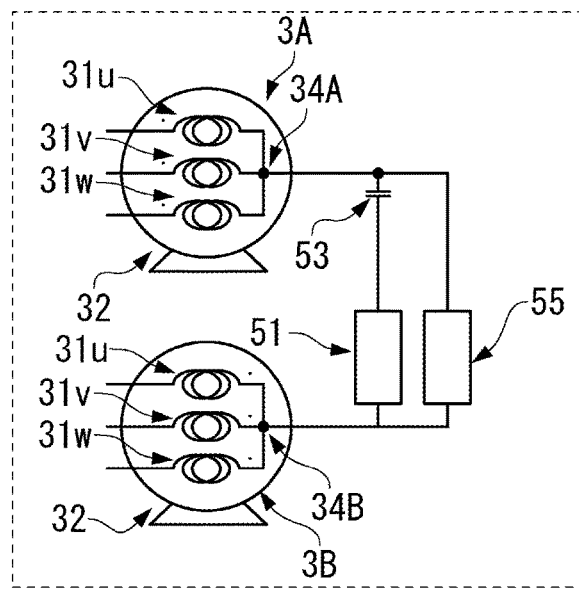
Figure 4C:
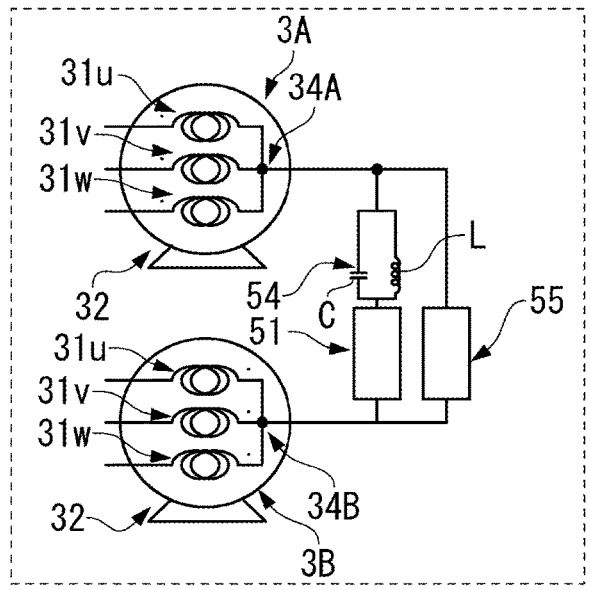
Figure 4D:
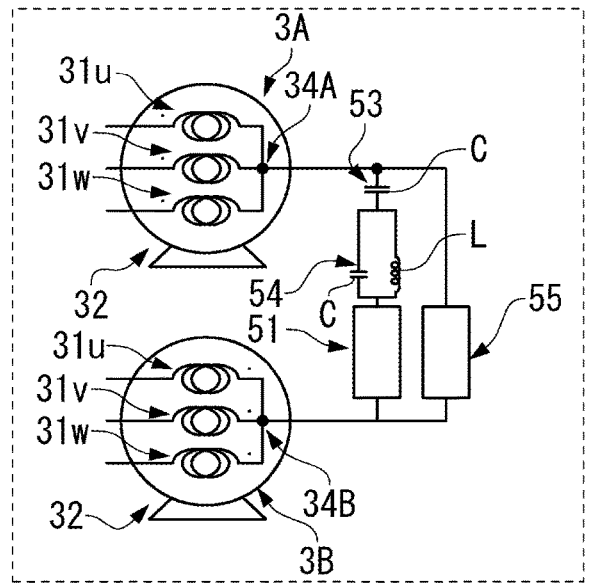
Figure 5A:
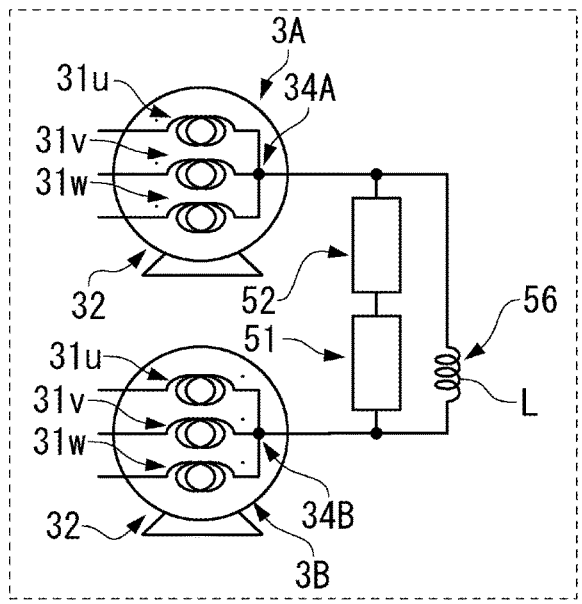
FIG. 5 is a block diagram of a bypass filter of the motor driving device according to Embodiment 3 of the present invention.
Figure 5B:
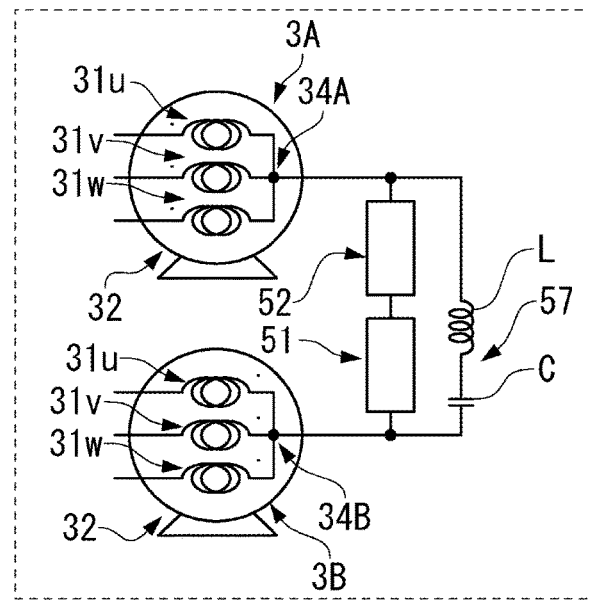
Figure 5C:
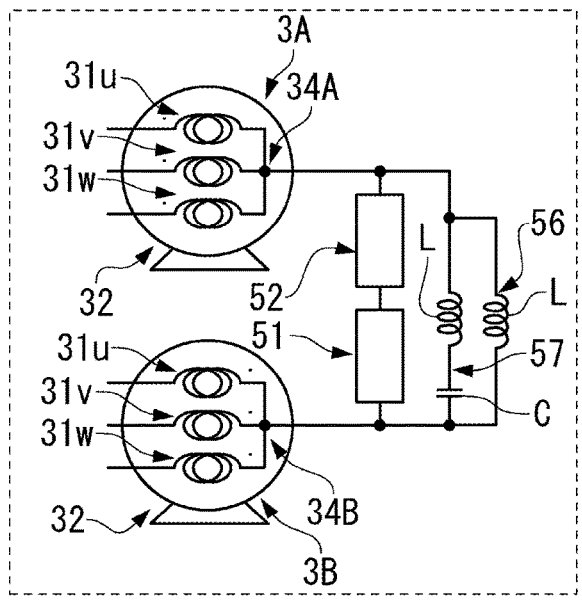

FIG. 4A shows an example in which both a rejection filter 52 and a bypass filter 55 are provided. In this example, the rejection filter 52 is connected in series to the impedance circuit 51, and the bypass filter 55 is connected in parallel to the impedance circuit 51 and the rejection filter 52. FIG. 4A shows a basic configuration of Embodiment 2, and FIGS. 4B to 4D and 5A to 5C more specifically show the basic configuration. FIGS. 4B to 4D show specific examples of the rejection filter 52, and FIGS. 5A to 5C show specific examples of the bypass filter 55.

FIG. 4B shows a rejection filter 53 including a capacitor.

The capacitor can reject current in a middle frequency range and a low-frequency range, but cannot reject current in a high-frequency range. Thus, using the rejection filter 53 allows the current in the high-frequency range to preferentially flow into the impedance circuit 51, thereby reducing loss.

The capacitor can achieve a loss reduction effect proportional to a difference in frequency between the high-frequency range and the middle frequency range, and thus an approximately 100-fold difference in frequency needs to be ensured between the high-frequency range and the middle frequency range.

The high-frequency range in Embodiment 3 refers to a frequency range of 100 kHz or higher, the middle frequency range refers to a frequency range of around 10 kHz, and the low-frequency range refers to a frequency range of several kHz or lower. The middle frequency range is a switching frequency range in the inverter circuit 15, and the low-frequency range is a harmonic frequency range.

FIG. 4C shows an LC parallel resonant circuit including a capacitor C and an inductor L and used as a rejection filter 54.

If a resonance frequency is in the middle frequency range, the LC parallel resonant circuit can reject the current in the middle frequency range, but cannot reject the current in the high-frequency range. Thus, using the rejection filter 54 allows the current in the high-frequency range to preferentially flow into the impedance circuit 51, thereby reducing loss.

The LC parallel resonant circuit can achieve a 100-fold or more loss reduction effect even with an approximately 10-fold difference in frequency between the high-frequency range and the middle frequency range. Thus, the LC parallel resonant circuit achieves a higher loss reduction effect than the rejection filter 53, but cannot reject the current in the low-frequency range and cannot reduce loss in the low-frequency range.

However, as shown in FIG. 3D, a combination of the rejection filter 53 and the rejection filter 54 can reduce loss in the middle frequency range and the low-frequency range. If there is no harmonic to be rejected in the low-frequency range, the rejection filter 53 does not need to be combined with the rejection filter 54.

Next, FIG. 5A shows the inductor L used as a bypass filter 56.

The inductor L can bypass the current in the middle frequency range and the low-frequency range, but cannot bypass the current in the high-frequency range. Thus, the bypass filter 56 allows the current in the high-frequency range to preferentially flow into the impedance circuit 51, thereby reducing loss.

The inductor L can achieve a loss reduction effect proportional to a difference in frequency between the high-frequency range and the middle frequency range, and thus an approximately 100-fold difference in frequency needs to be ensured between the high-frequency range and the middle frequency range.

FIG. 5B shows an LC series resonant circuit including the capacitor C and the inductor L and used as a bypass filter 57.

If a resonance frequency is in the middle frequency range, the LC series resonant circuit can bypass the current in the middle frequency range, but cannot bypass the current in the high-frequency range. Thus, using the bypass filter 57 allows the current in the high-frequency range to preferentially flow into the impedance circuit, thereby reducing loss.

The LC series resonant circuit can achieve a 100-fold or more loss reduction effect even with an approximately 10-fold difference in frequency between the high-frequency range and the middle frequency range. Thus, the LC series resonant circuit achieves a higher loss reduction effect than the bypass filter 56, but cannot bypass the current in the low-frequency range and cannot reduce loss in the low-frequency range.

However, as shown in FIG. 5C, a combination of the bypass filter 57 and the bypass filter 56 can reduce loss in the middle frequency range and the low-frequency range. If there is no harmonic to be bypassed in the low-frequency range, the bypass filter 57 does not need to be combined with the bypass filter 56.

The LC parallel resonant circuit is used as the rejection filter 54, and the LC series resonant circuit is used as the bypass filter 57. The LC parallel resonant circuit and the LC series resonant circuit can use self-resonant characteristics of the capacitor C to obtain a resonance frequency of approximately 10 kHz or higher even without the inductor L.

The self-resonant characteristics of the capacitor C may be directly used as series resonance.

When the self-resonant characteristics of the capacitor C are used as parallel resonance, electrodes of the capacitor C are short-circuited, and inductance of the short-circuit(-wire) is used. Specifically, the inductor L as a component is not always necessary, so the inductance of the wire can be used as the inductor L.

Generally, the rejection filter and the bypass filter can be selected as described below.

Specifically, whether the rejection filter or the bypass filter is used depends on which of a utilization ratio of power source voltage and a utilization ratio of power source current of the three-phase AC motor has priority.

When the rejection filter is used, the utilization ratio of the power source current is low, but the current in the middle frequency range and the low-frequency range can be rejected. This increases a potential difference in the middle frequency range and the low-frequency range of the first motor 3A and the second motor 3B, and increases the utilization ratio of the power source voltage.

When the bypass filter is used, the current in the middle frequency range and the low-frequency range is bypassed. This reduces the potential difference in the middle frequency range and the low-frequency range of the first motor 3A and the second motor 3B, and thus reduces the utilization ratio of the power source voltage, while increases the utilization ratio of the power source current.

When the rejection filter and the bypass filter are simultaneously used, the utilization ratio of the power source voltage and the utilization ratio of the power source current may be intermediate between those when the rejection filter is used and those when the bypass filter is used.

[Effects of Embodiment 3]

Next, effects of Embodiment 3 will be described. Into the impedance circuit 51 (used in Embodiment 1) is flowed not only the current in the high frequency range which causes noise (and causes reflection (of the noise) which must be prevented) but also the current in the middle frequency range of the switching frequency and a current in the low frequency range of the harmonic frequency, thereby increasing loss.

The current in the middle frequency range and the low-frequency range has a longer wavelength as compared to the cable (line) including the rejection filter 52, 53, or 54 or the bypass filter 55, 56, or 57 in Embodiment 3. The current has the same potential over the entire length of the cable and does not have wave nature, and is thus not reflected. Thus, no reflection occurs to be prevented by impedance matching between the balanced line 44*u*, 44*v*, 44*w* and the impedance circuit 51. Thus, even if the rejection filter 52, 53, or 54 or the bypass filter 55, 56, or 57 prevents the current in the middle frequency range and the low-frequency range from flowing into the impedance circuit 51 to reduce loss, the reflection preventing effect of Embodiment 1 is not reduced.

Embodiment 4

Next, with reference to FIG. 6, Embodiment 4 according to the present invention will be described.

In Embodiment 4, a bidirectional switch is connected in series to the inductor in the loss reduction circuit in Embodiment 3. In Embodiment 4, an example of application of the bidirectional switch to the impedance circuit 51 in Embodiment 1-1 of Embodiment 1 is described, but application to the impedance circuit 51 in Embodiment 1-2 of Embodiment 1 is acceptable.

FIG. 6 shows five examples of a bidirectional switch 58 connected in series to the inductor L.

Figure 6A:
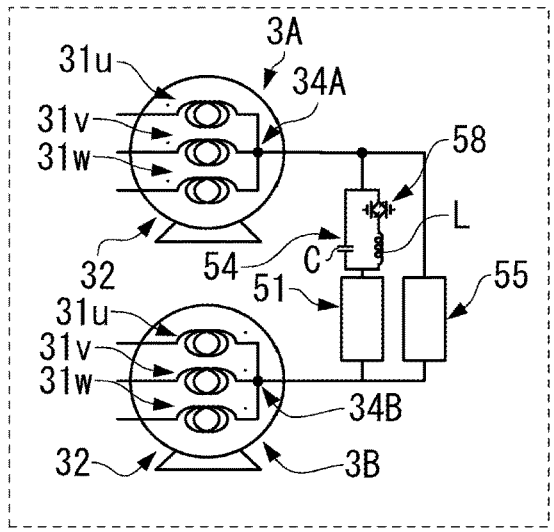
FIG. 6 is a block diagram of a bidirectional switch of a motor driving device according to Embodiment 4 of the present invention.
Figure 6B:
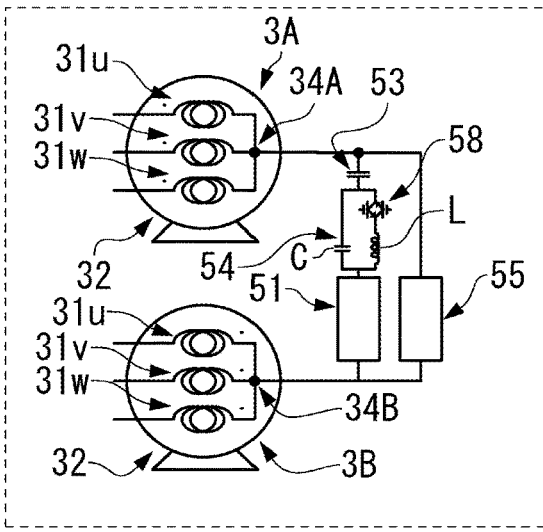

In FIG. 6A, the bidirectional switch 58 is connected in series to the inductor L of the rejection filter 54 in FIG. 4C. In FIG. 6B, the bidirectional switch 58 is connected in series to the inductor L of the rejection filter 54 in FIG. 4D.

Figure 6C:
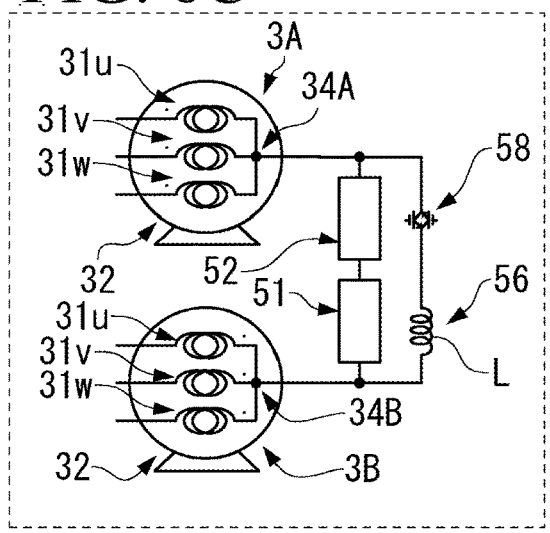
Figure 6D:
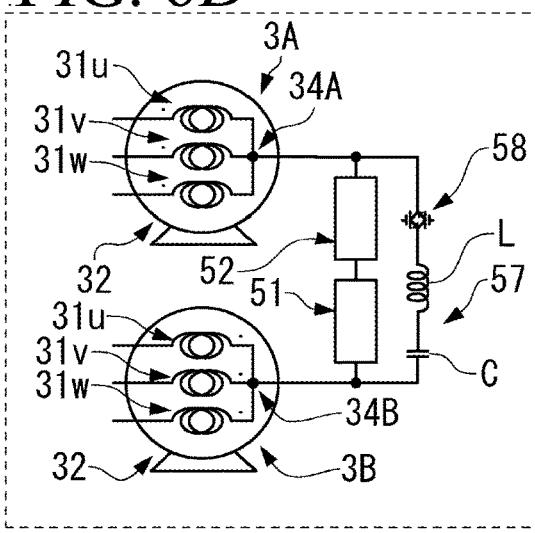
Figure 6E:
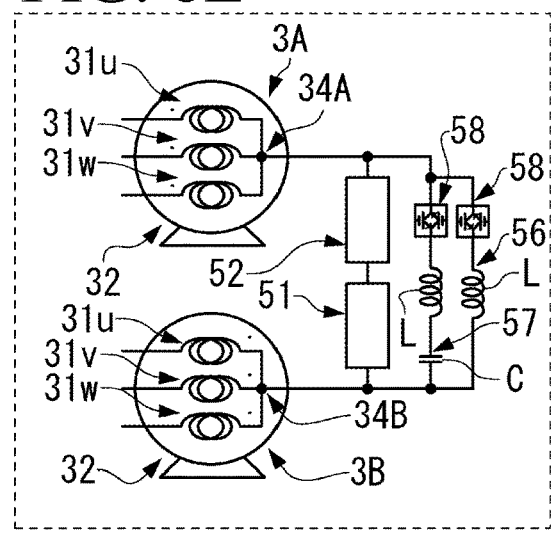

In FIG. 6C, the bidirectional switch 58 is connected in series to the inductor L of the bypass filter 56 in FIG. 5A. In FIG. 6D, the bidirectional switch 58 is connected in series to the inductor L of the bypass filter 57 in FIG. 5D. In FIG. 6E, the bidirectional switch 58 is connected in series to each of the inductor L of the bypass filter 56 and the inductor L of the bypass filter 57 in FIG. 5E.

The bidirectional switch 58 may be a bidirectional transistor, an insulated gate bipolar transistor (IGBT), a field-effect transistor (FET), a silicon controlled rectifier (SCR), or the like.

While current i(A (ampere)) is passed through the inductor L of an inductance value L (H (henry)), the bidirectional switch 58 is used to disconnect the inductor L. Then, counter electromotive voltage Vr calculated by Equation (1) below is generated across the inductor L. Thus, in a real circuit, to suppress generation of the counter electromotive voltage Vr, there is a need to add a counter electromotive voltage removing circuit to the inductor L or to operate the bidirectional switch 58 synchronously with timing when the current i flowing through the inductor L becomes 0 (A).

$$Vr = -L \times Di/Dt \ (V(\text{volt})) \tag{1}$$

Next, effects of Embodiment 4 will be described.

In some driving states of the three-phase AC motor, current of the same frequency may continuously flow, or repeatedly sharply changing current may flow.

If the current of the resonance frequency is continuously applied to the resonant circuit, the resonant circuit may oscillate. If the repeatedly sharply changing current is applied to the inductor L, overvoltage may be repeatedly generated. The oscillation may cause abnormal vibration of the three-phase AC motor, and the repeated overvoltage may lead to insulation degradation.

In this respect, in Embodiment 4, the bidirectional switch 58 is provided to allow the inductor L of the loss reduction circuit to be disconnected from the impedance circuit 51. When the driving state of the three-phase AC motor is monitored, and the current of the resonance frequency is continuously applied to the resonant circuit or the repeatedly sharply changing current is applied to the inductor, the inductor L can be disconnected from the impedance circuit 51 to suppress oscillation of the resonant circuit or overvoltage of the inductor.

Even if the inductor L is disconnected, the impedance circuit 51 that suppresses reflection is still connected, thereby reducing reflection of the current in the high-frequency range.

Embodiment 5

Next, with reference to FIG. 7, Embodiment 5 according to the present invention will be described.

In Embodiment 5, a plurality of impedance circuits 60A, 60B, . . . each including a loss reduction circuit are provided in parallel, and the impedance circuit 60A, or 60B, . . . to be used is selected according to an operation situation of the driving device 10. In Embodiment 5, an example of application to the impedance circuit 51 in Embodiment 1-1 of Embodiment 1 is described, but application to the impedance circuit 51 in Embodiment 1-2 of Embodiment 1 is acceptable.

Figure 7:
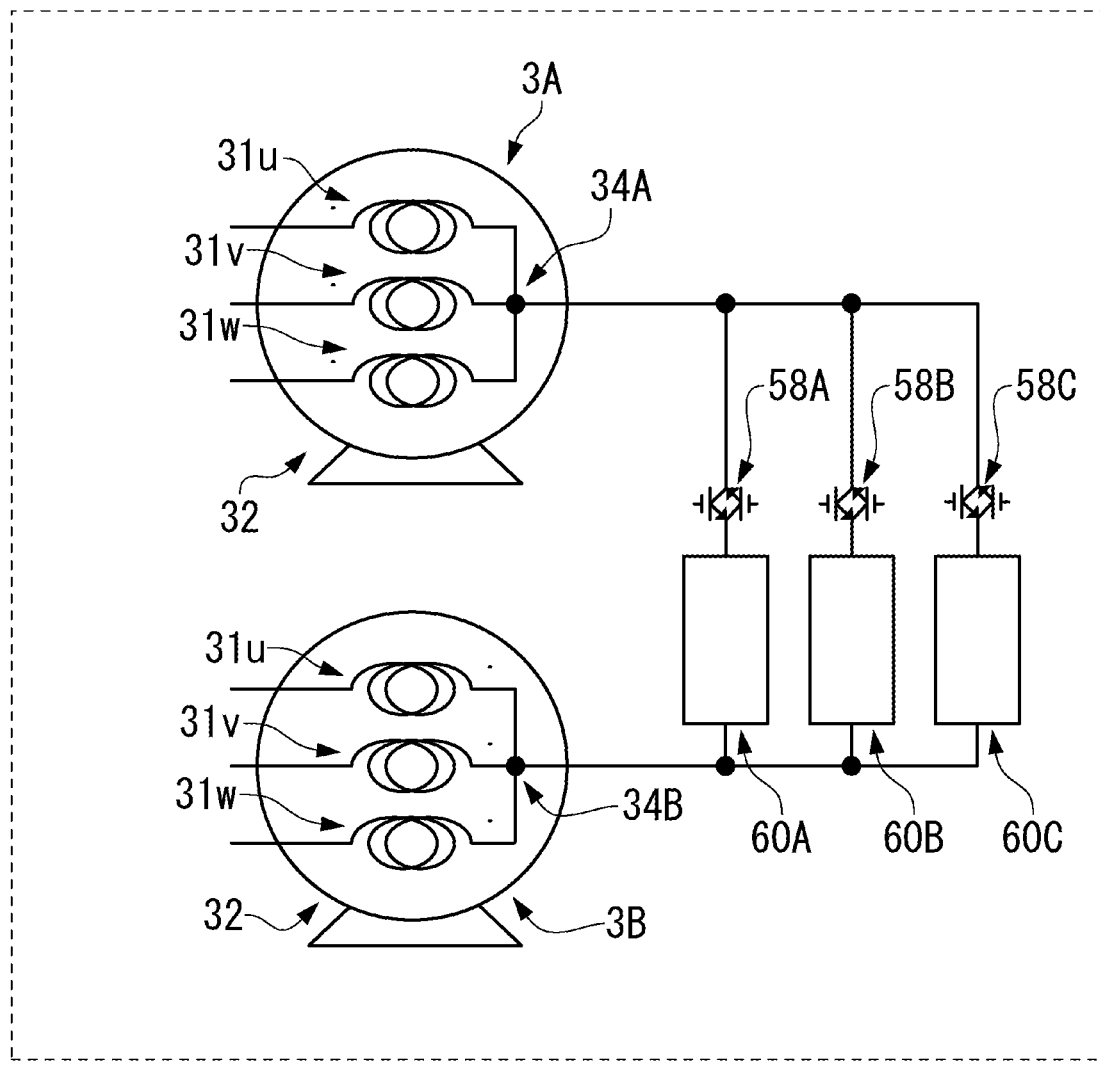
FIG. 7 is a block diagram of an impedance circuit of a motor driving device according to Embodiment 5 of the present invention.

FIG. 7 shows an example in which three impedance circuits 60A, 60B, 60C are provided. The impedance circuits 60A, 60B, 60C are connected between the first neutral point 34A and the second neutral point 34B. Thus, the impedance circuits 60A, 60B, 60C are provided in parallel to the first neutral point 34A and the second neutral point 34B. Although not shown, the impedance circuits 60A, 60B, 60C each include the loss reduction circuit described in Embodiment 3. Here, as an example, in the impedance circuit 60A, the loss reduction circuit rejects or bypasses the frequency in a broad range of, for example, 100 kHz or higher. Similarly, in the impedance circuit 60B, the loss reduction circuit rejects or bypasses the frequency in a middle range of, for example, 1 MHz or higher, and in the impedance circuit 60C, the loss reduction circuit rejects or bypasses the frequency in a narrow range of, for example, 10 MHz or higher. As such, in Embodiment 5, the plurality of loss reduction circuits having different characteristics are provided correspondingly to the plurality of (three here) impedance circuits 60A, 60B, 60C.

Bidirectional switches 58A, 58B, 58C are added to the impedance circuits 60A, 60B, 60C, respectively. Operations of the bidirectional switches 58A, 58B, 58C are controlled to select an impedance circuit to be operated from the impedance circuits 60A, 60B, 60C. Specifically, if the impedance circuit 60A is operated but the impedance circuits 60B, 60C are not operated, the impedance circuit 60A reduces loss in the broad range.

Next, effects of Embodiment 5 will be described.

For reflection prevention, it is preferable to prevent reflection in as broad a frequency range as possible. However, for loss reduction, it is preferable to prevent reflection in as narrow a frequency range as possible. Thus, a loss reduction circuit is preferably provided having an optimum constant for allowing both reflection prevention and loss reduction.

However, the frequency range, reflection of which is to be prevented, changes according to the operation state of the three-phase AC motor, and thus it is difficult to achieve reflection prevention and loss reduction in all operation states with a single loss reduction circuit. Then, as in Embodiment 5, the plurality of loss reduction circuits having different characteristics are provided, and the impedance circuit 60A, 60B, or 60C to be used is selected according to the operation state. This can achieve optimum reflection prevention and loss reduction in corresponding frequency ranges.

Embodiment 6

Next, with reference to FIGS. 8 and 9, Embodiment 6 of the present invention will be described.

In Embodiment 6, common mode choke coils are provided in appropriate positions to suppress zero-phase-sequence current. Embodiment 6 includes Embodiment 6-1 relating to a driving device 10A and Embodiment 6-2 relating to a driving device 10B. Basic configurations of the driving device 10A and the driving device 10B are based on the configuration of the driving device 10 of Embodiment 1 or the like described above. Thus, the same components as in the driving device 10 are denoted by the same reference numerals, and differences from the driving device 10 will be mainly described. The same applies to Embodiments 7 and 8 described later.

Embodiment 6-1 (Driving Device 10A)

The driving device 10A includes, correspondingly to the first inverter circuit 15A, a first power source 11A that outputs three-phase AC current and a first converter 13A that converts the three-phase AC current output from the first power source 11A into DC current and outputs the DC current toward the first inverter circuit 15A. The driving device 10A also includes, correspondingly to the second inverter circuit 15B, a second power source 11B that outputs three-phase AC current and a second converter 13B that converts the three-phase AC current output from the second power source 11B into DC current and outputs the DC current toward the second inverter circuit 15B.

Figure 8:
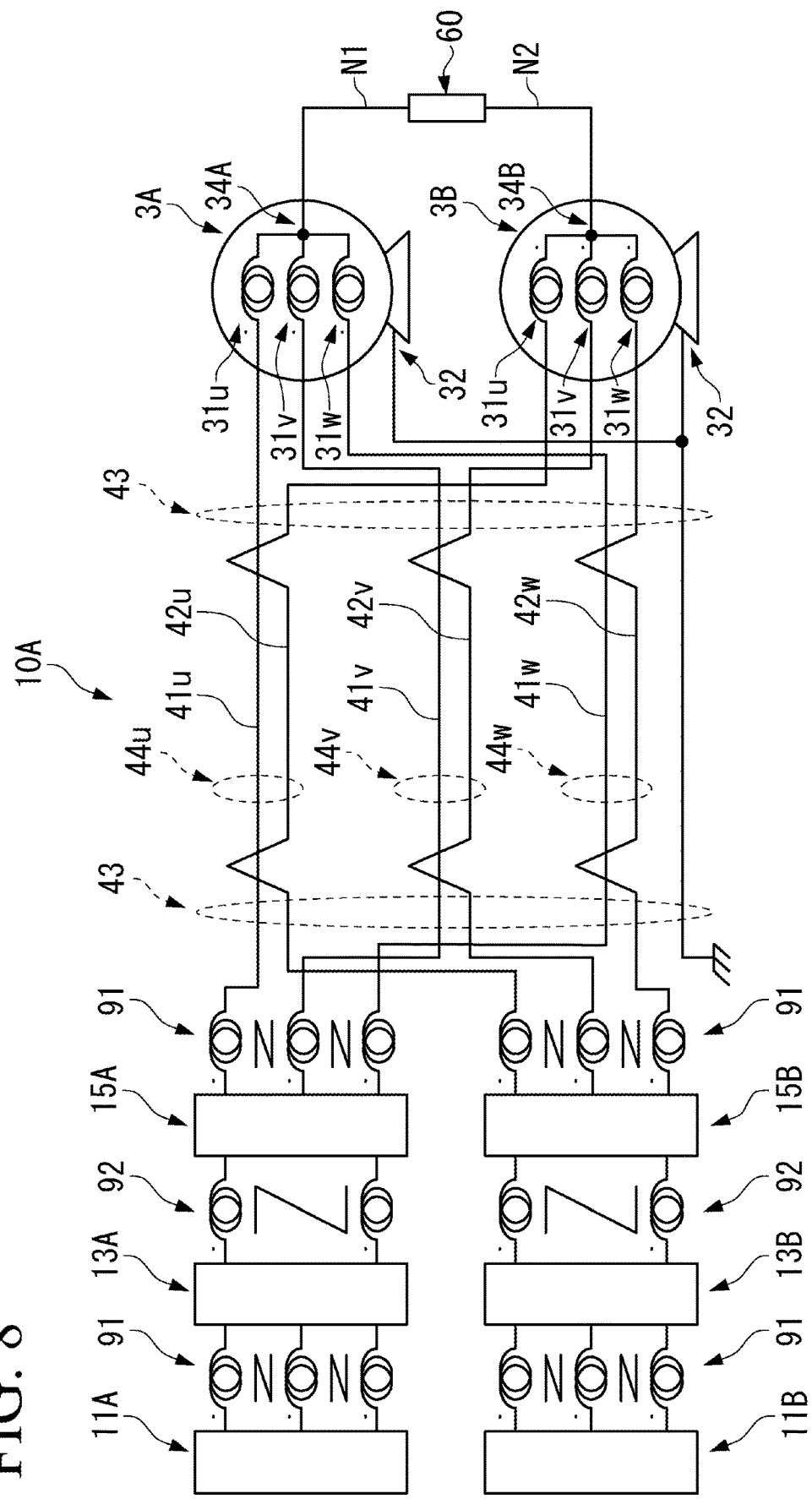
FIG. 8 is a block diagram of a motor driving device according to Embodiment 6 of the present invention.

As shown in FIG. 8, the driving device 10A includes three-phase common mode choke coils 91 between the first power source 11A and the first converter 13A and between the second power source 11B and the second converter 13B. The driving device 10A also includes two-phase common mode choke coils 92 between the first converter 13A and the first inverter circuit 15A and between the second converter 13B and the second inverter circuit 15B. The driving device 10A further includes three-phase common mode choke coils 91 between the first inverter circuit 15A and the first motor 3A and between the second inverter circuit 15B and the second motor 3B.

The driving device 10A includes the common mode choke coils all of between the power sources and the converters, between the converters and the inverters, and between the inverters and the motors. However, this is not essential to Embodiment 6, but the driving device 10A may include the common mode coils in at least one of between the power sources and the converters, between the converters and the inverters, and between the inverters and the motors.

In FIG. 8, the first power source 11A and the second power source 11B are individually provided. However, a single power source may supply three-phase AC current to the first converter 13A and the second converter 13B. The same applies to the first converter 13A and the second converter 13B, and a single converter may receive the three-phase AC current and supplies DC current to the first inverter circuit 15A and the second inverter circuit 15B.

Further, a DC power source may replace the first power source 11A, the second power source 11B, the first converter 13A, and the second converter 13B.

For the driving device 10A, an example of application to the impedance circuit 51 in Embodiment 1-1 of Embodiment 1 is described, but application to the impedance circuit 51 in Embodiment 1-2 of Embodiment 1 is acceptable.

Next, effects of the driving device 10A according to Embodiment 6-1 will be described.

The driving device 10A prevents overvoltage caused by reflection even when zero-phase-sequence current is generated, and can further suppress the zero-phase-sequence current in combination with the common mode choke coils.

Embodiment 6-2 (Driving Device 10B)

Next, a driving device 10B will be described.

Figure 9:
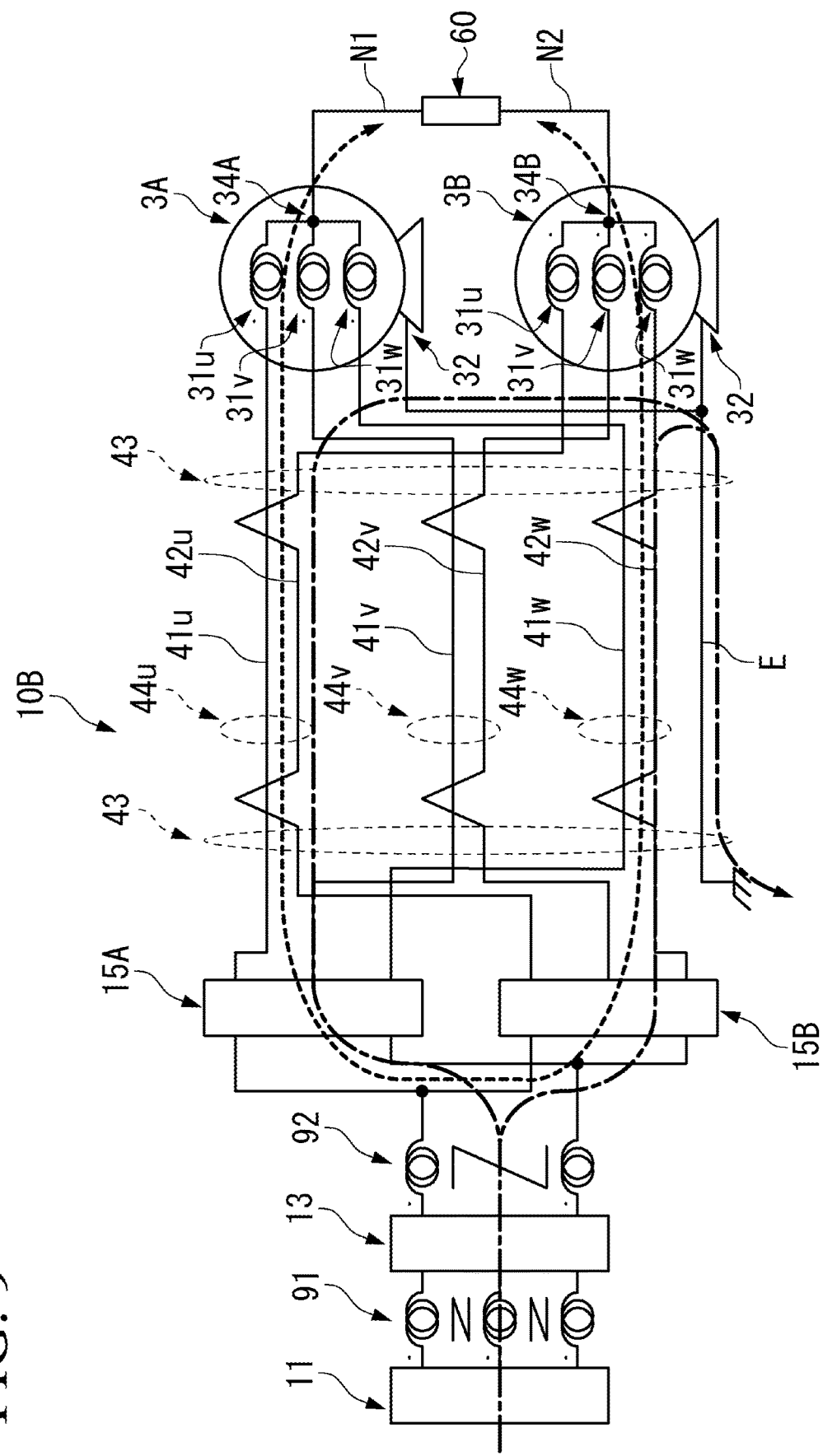
FIG. 9 is a block diagram of another motor driving device according to Embodiment 6 of the present invention.

As shown in FIG. 9, the driving device 10B includes a shared power source 11 replacing the first power source 11A and the second power source 11B, and a shared converter 13 replacing the first converter 13A and the second converter 13B. The driving device 10B includes a single three-phase common mode choke coil 91 between the shared power source 11 and the shared converter 13, and a single two-phase common mode choke coil 92 between the shared converter 13 and the first inverter circuit 15A and the second inverter circuit 15B.

In the driving device 10B, a circulation path shown by dashed arrows is formed in the order from the first motor 3A through the first inverter circuit 15A, the second inverter circuit 15B, the second motor 3B, and the impedance circuit 60 back to the first motor 3A or in the reverse order. The circulation path does not include the common mode choke coils 91, 92.

On the other hand, a series path including the common mode choke coils 91, 92 is formed in a path shown by a dashed-dotted line from the shared power source 11 through the converter 13, the first inverter circuit 15A and the second inverter circuit 15B, the stators 32 of the first motor 3A and the second motor 3B to the ground wire E.

The common mode choke coils 91, 92 reject passage of the current in the high-frequency range. Thus, the current in the high-frequency range is less likely to flow through the series path, which includes the common mode choke coils 91, 92, shown by the dashed-dotted line and connected to the ground wire E. On the other hand, the circulation path shown by the dashed line and separated from the ground wire E does not include the common mode choke coils 91, 92, and thus the current in the high-frequency range is likely to flow therethrough. Specifically, according to this embodiment, the current in the high-frequency range can preferentially flow into the impedance circuit 60, thereby allowing both prevention of leakage current to the ground wire E and reduction of noise by the impedance circuit 60. The driving device 10B includes the two common mode choke coils 91, 92. However, this is not essential, but the driving device 10B may include at least one of the common mode coil 91 and the common mode choke coil 92. Further, when the driving device 10B includes only the three-phase common mode choke coil 91, there is no need to replace the converters 13A, 13B with the shared converter 13.

Embodiment 7

Figure 10:
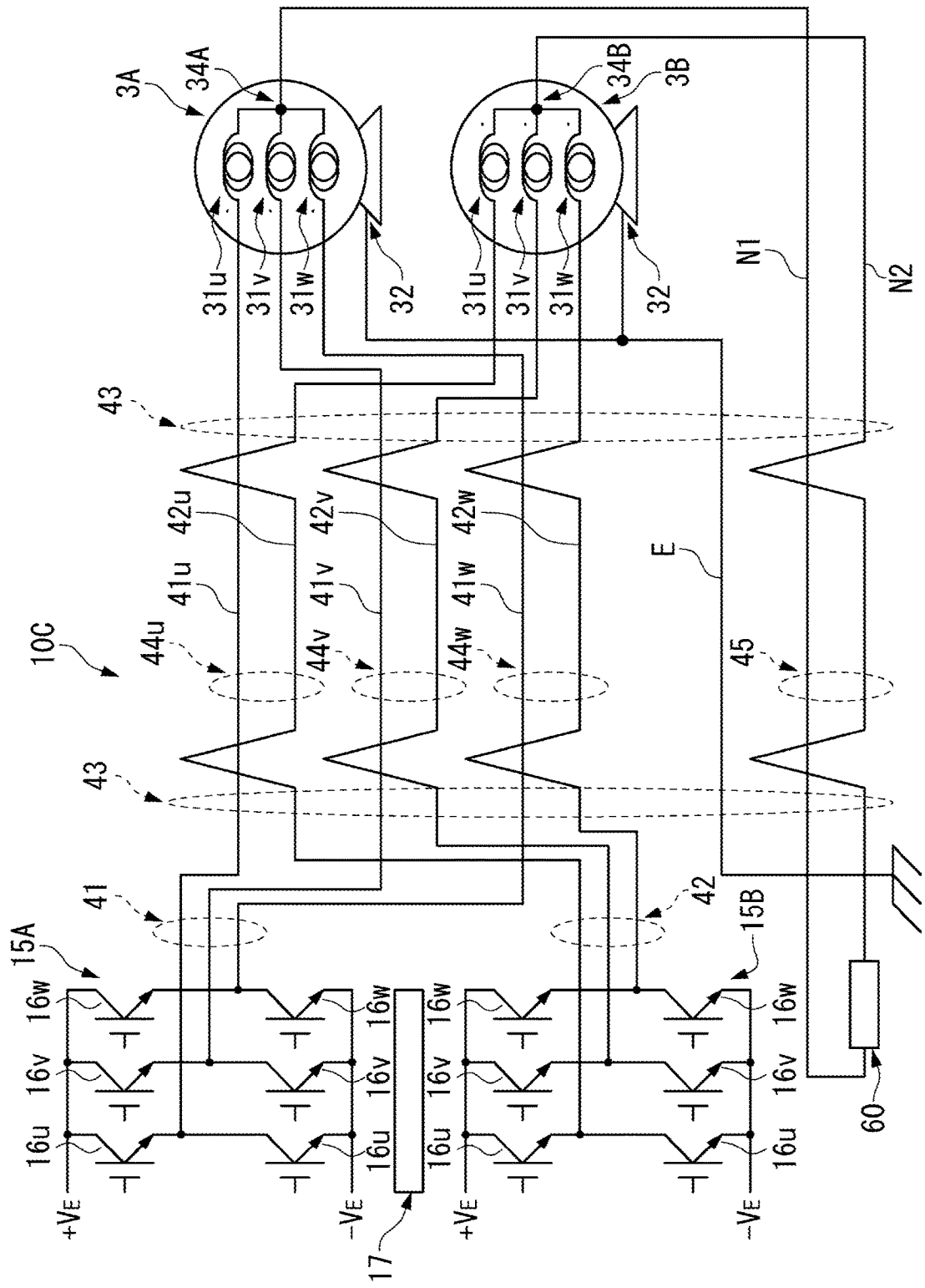
FIG. 10 is a block diagram of a motor driving device according to Embodiment 7 of the present invention.
Figure 11:
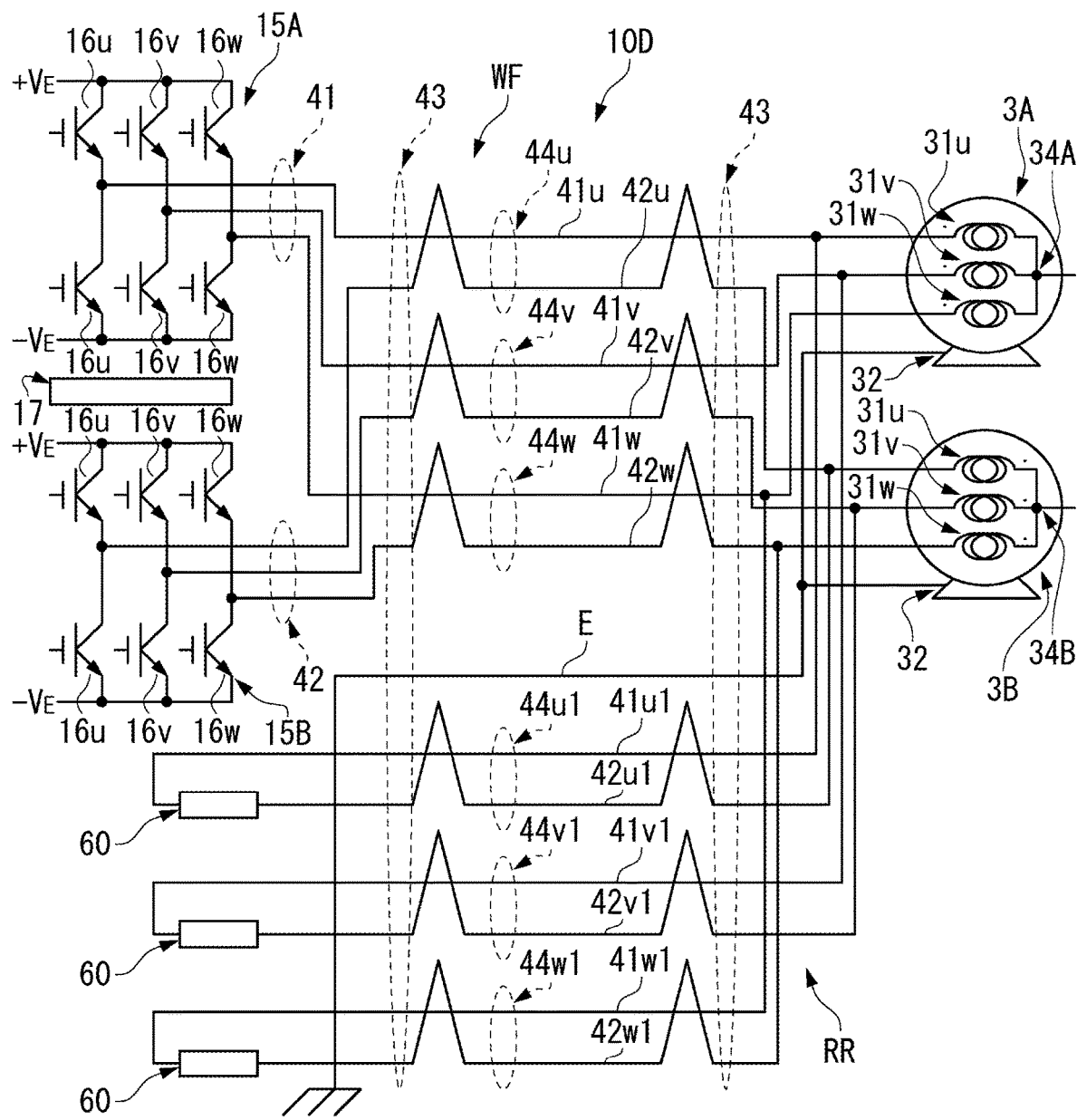
FIG. 11 is a block diagram of another motor driving device according to Embodiment 7 of the present invention.

Next, with reference to FIGS. 10 and 11, Embodiment 7 according to the present invention will be described.

In Embodiment 7, the position of the impedance circuit 60 is changed. Embodiment 7 includes Embodiment 7-1 relating to a driving device 10C and Embodiment 7-2 relating to a driving device 10D. The driving device 10C corresponds to Embodiment 1-1 of Embodiment 1, and the driving device 10D corresponds to Embodiment 1-2 of Embodiment 1.

Embodiment 7-1 (Driving Device 10C)

In some cases, there is no appropriate space between the first neutral point 34A of the first motor 3A and the second neutral point 34B of the second motor 3B, and it is difficult to mount the impedance circuit 60. The driving device 10C addresses such cases. As shown in FIG. 10, a first neutral line N1 and a second neutral line N2 connected to the first neutral point 34A of the first motor 3A and the second neutral point 34B of the second motor 3B form balanced line 45. The balanced line 45 are extended from the first neutral point 34A and the second neutral point 34B so as to reach the driving device including the first inverter circuit 15A and the second inverter circuit 15B. In the driving device 10C, the impedance circuit 60 is mounted in the balanced line 45. Mounting the impedance circuit 60 requires at least wires including signal wires of the first neutral line N1 and N2, a terminal block, and a connector. This will be disclosed in Embodiment 8. The same applies to Embodiment 7-2.

Next, effects of the driving device 10C according to Embodiment 7-1 will be described.

In the driving device 10C, the impedance circuit 60 can be provided in an appropriate position even if there is no appropriate position for waterproofing and dustproofing of the impedance circuit 60 between the first motor 3A and the second motor 3B in terms of the configuration of the driving device 10C.

Embodiment 7-2 (Driving Device 10D)

In some cases, there is no appropriate space between the U-phase and the U'-phase, between the V-phase and the V'-phase, and between the W-phase and the W'-phase of the first motor 3A and the second motor 3B, and it is difficult to mount the impedance circuit 60. The driving device 10D addresses such cases. As shown in FIG. 11, the driving device 10D includes a main path WF connecting the inverter circuit 15 and the motor 3 and also a sub-path RR branching off from the main path WF. The driving device 10D includes the impedance circuit 60 in the sub-path RR. Details will be described below.

The main path WF includes balanced line 44$u$, 44$v$, 44$w$ including a pair of a U-phase line 41$u$ and a U'-phase line 42$u$, a pair of a V-phase line 41$v$ and a V'-phase line 42$v$, and a pair of a W-phase line 41$w$ and a W'-phase line 42$w$, respectively.

The sub-path RR includes balanced line 44$u$1, 44$v$1, 44$w$1 including a pair of a U-phase line 41$u$1 and a U'-phase line 42$u$1, a pair of a V-phase line 41$v$1 and a V'-phase line 42$v$1, and a pair of a W-phase line 41$w$1 and a W'-phase line 42$w$1, respectively.

The U-phase line 41$u$1 and the U'-phase line 42$u$1 of the balanced line 44$u$1 branch off from the U-phase line 41$u$ and the U'-phase line 42$u$ of the balanced line 44$u$, respectively. An impedance circuit 60 is provided in a position where the U-phase line 41$u$1 and the U'-phase line 42$u$1 meet. The balanced line 44$u$1 including the impedance circuit 60 branch off from the balanced line 44$u$ so as to divert from the balanced line 44$u$.

The V-phase line 41$v$1 and the V'-phase line 42$v$1 of the balanced line 44$v$1 branch off from the V-phase line 41$v$ and the V'-phase line 42$v$ of the balanced line 44$v$, respectively. An impedance circuit 60 is provided in a position where the V-phase line 41$v$1 and the V'-phase line 42$v$1 meet. The balanced line 44$v$1 including the impedance circuit 60 branch off from the balanced line 44$v$ so as to divert from the balanced line 44$v$.

Further, the W-phase line 41$w$1 and the W'-phase line 42$w$1 of the balanced line 44$w$1 branch off from the W-phase line 41$w$ and the W'-phase line 42$w$ of the balanced line 44$w$, respectively. An impedance circuit 60 is provided in a position where the W-phase line 41$w$1 and the W'-phase line 42$w$1 meet. The balanced line 44$w$1 including the impedance circuit 60 branch off from the balanced line 44$w$ so as to divert from the balanced line 44$w$.

In the driving device 10D, as in the driving device 10C, the impedance circuits 60 can be provided in appropriate positions even if there are no appropriate positions for waterproofing and dustproofing of the impedance circuits 60 between the first motor 3A and the second motor 3B.

Embodiment 8

Next, with reference to FIGS. 12 to 17, Embodiment 8 according to the present invention will be described.

In Embodiment 8, a variant of connection between the first motor 3A and the second motor 3B is described. Embodiment 8 includes Embodiment 8-1 relating to a driving device 10E and a driving device 10F, Embodiment 8-2 relating to a driving device 10G and a driving device 10H, Embodiment 8-3 relating to a driving device 10I, and Embodiment 8-4 relating to a driving device 10J.

Embodiment 8-1 (Driving Devices 10E, 10F)

In Embodiment 8-1, the first motor 3A and the second motor 3B are connected in series. In Embodiment 8-1, as in Embodiment 1-1, the impedance circuit 60 is provided between the first neutral point 34A and the second neutral point 34B.

Figure 12:
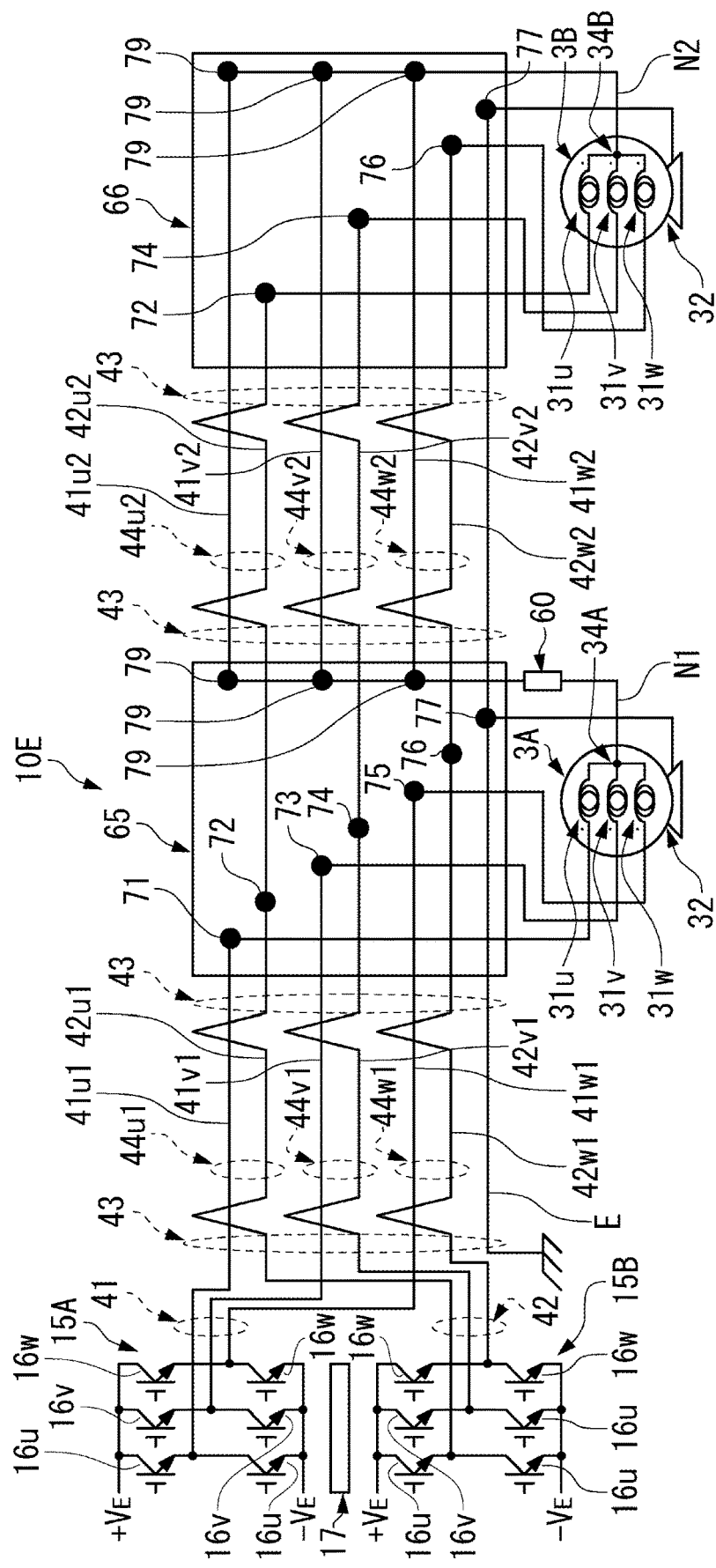
FIG. 12 is a block diagram of a motor driving device according to Embodiment 8 of the present invention.

In the driving device 10E in FIG. 12, the first inverter circuit 15A and the second inverter circuit 15B and the first motor 3A are connected by balanced line 44$u$1, 44$v$1, 44$w$1, and the first motor 3A and the second motor 3B are connected by balanced line 44$u$2, 44$v$2, 44$w$2. The driving device 10F in FIG. 13 has the same circuit configuration as the driving device 10E including the configuration described below.

The balanced line 44$u$1, 44$v$1, 44$w$1 include a pair of a U-phase line 41$u$1 and a U'-phase line 42$u$1, a pair of a V-phase line 41v1 and a V'-phase line 42v1, and a pair of a W-phase line 41w1 and a W'-phase line 42w1.

The balanced line 44u2, 44v2, 44w2 include a pair of a U-phase line 41u2 and a U'-phase line 42u2, a pair of a V-phase line 41v2 and a V'-phase line 42v2, and a pair of a W-phase line 41w2 and a W'-phase line 42w2.

The U'-phase line 42u2, the V'-phase line 42v2, and the W'-phase line 42w2 of the balanced line 44u2, 44v2, 44w2 branch off from the first neutral line N1 connected to the first neutral point 34A of the first motor 3A, and meet the second neutral line N2 connected to the second neutral point 34B of the second motor 3B.

The U'-phase line 42u2, the V'-phase line 42v2, and the W'-phase line 42w2 of the balanced line 44u2, 44v2, 44w2 are connected via a U'-phase terminal 72, a V'-phase terminal 74, and a W'-phase terminal 76 to the U'-phase line 42u1, the V'-phase line 42v1, and the W'-phase line 42w1. The U'-phase line 42u2, the V'-phase line 42v2, and the W'-phase line 42w2 are provided to extend from the U'-phase line 42u1, the V'-phase line 42v1, and the W'-phase line 42w1, respectively.

The driving device 10E includes a first terminal block 65 corresponding to the first motor 3A and a second terminal block 66 corresponding to the second motor 3B.

The first terminal block 65 includes a U-phase terminal 71, the U'-phase terminal 72, a V-phase terminal 73, the V'-phase terminal 74, a W-phase terminal 75, the W'-phase terminal 76, and a ground terminal 77 relating to connection of the U-phase line 41u1, the U'-phase line 42u1, the V-phase line 41v1, the V'-phase line 42v1, the W-phase line 41w1, the W'-phase line 42w1, and the ground wire E.

The first terminal block 65 includes three branch terminals 79 relating to connection of the U-phase line 41u2, the V-phase line 41v2, and the W-phase line 41w2.

The second terminal block 66 includes a U'-phase terminal 72, a V'-phase terminal 74, a W'-phase terminal 76, and a ground terminal 77 relating to connection of the U'-phase line 42u2, the V'-phase line 42v2, the W'-phase line 42w2, and the ground wire E. The second terminal block 66 includes three branch terminals 79 relating to connection of the U-phase line 41u2, the V-phase line 41v2, and the W-phase line 41w2.

Figure 13:
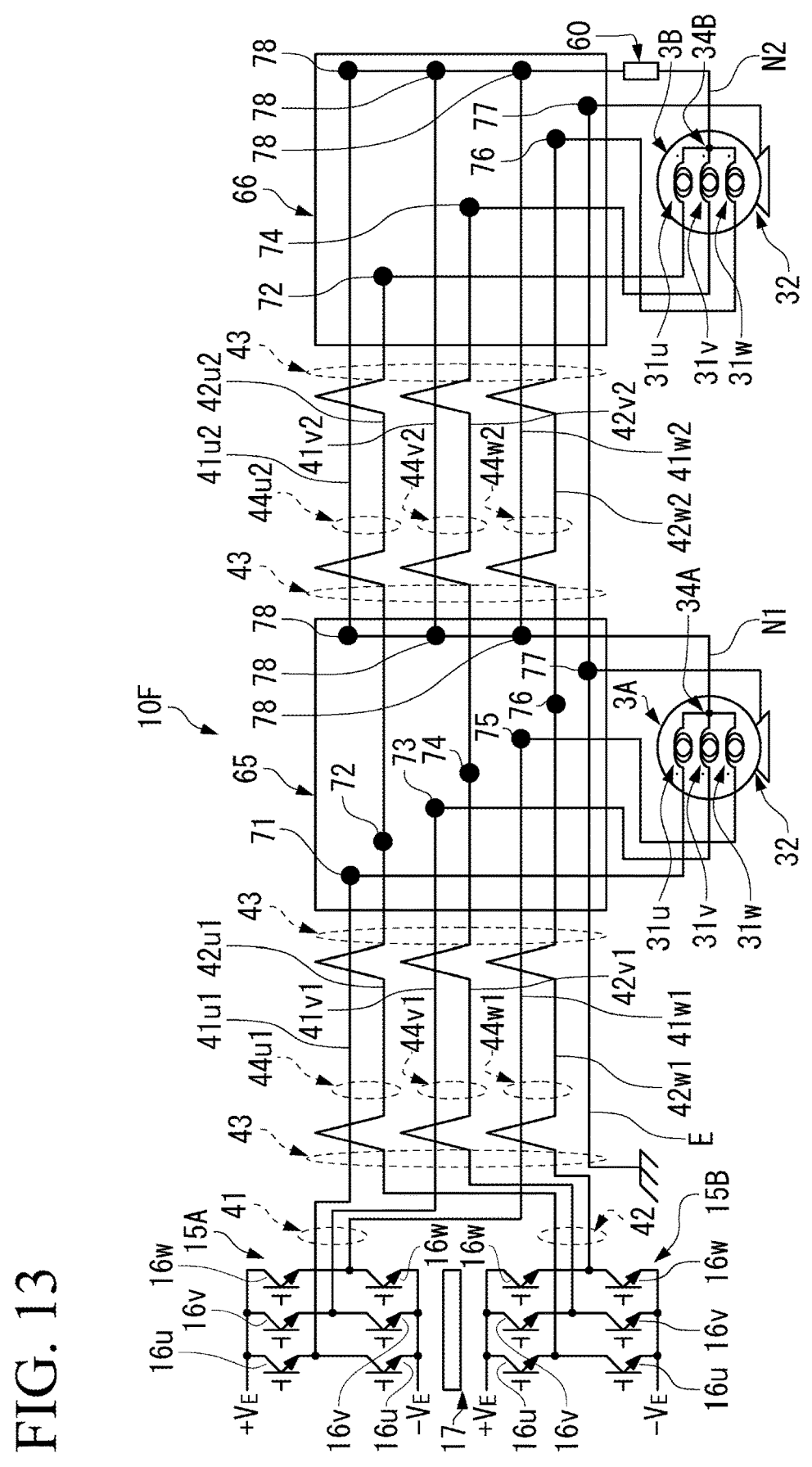

As shown in FIG. 12, in the driving device 10E including the above configuration, the impedance circuit 60 is mounted to the first neutral line N1, that is, on the side of the first motor 3A. As shown in FIG. 13, in the driving device 10F, the impedance circuit 60 is mounted to the second neutral line N2, that is, on the side of the second motor 3B. The first neutral line N1 and the second neutral line N2 form the U-phase line 41u2, the V-phase line 41v2, and the W-phase line 41w2 forming the balanced line.

Next, effects of Embodiment 8-1 will be described.

The balanced line 44u1, 44v1, 44w1, 44u2, 44v2, 44w2 all have the same characteristic impedance (RP). Then, the three lines include the branch terminals 79, and thus a composite characteristic impedance of the U-phase line 41u2, the V-phase line 41v2, and the W-phase line 41w2 can be Rp/3. The three lines include the branch terminals 79, and thus a composite characteristic impedance of the U-phase line 41u2, the V-phase line 41v2, and the W-phase line 41w2 can be Rp/3. Thus, even if the U-phase line 41u and the U'-phase line 42u, the V-phase line 41v and the V'-phase line 42v, and the W-phase line 41w and the W'-phase line 42w have different lengths and cannot be directly paired, impedance matching can be achieved.

Embodiment 8-2 (Driving Devices 10G, 10H)

In Embodiment 8-2, the first motor 3A and the second motor 3B are connected in series as in Embodiment 8-1. In Embodiment 8-2, as in Embodiment 1-2, the impedance circuit 60 is provided in each of the balanced line 44u2, 44v2, 44w2. A driving device 10G and a driving device 10H will be described mainly on differences from Embodiment 8-1.

Figure 14:
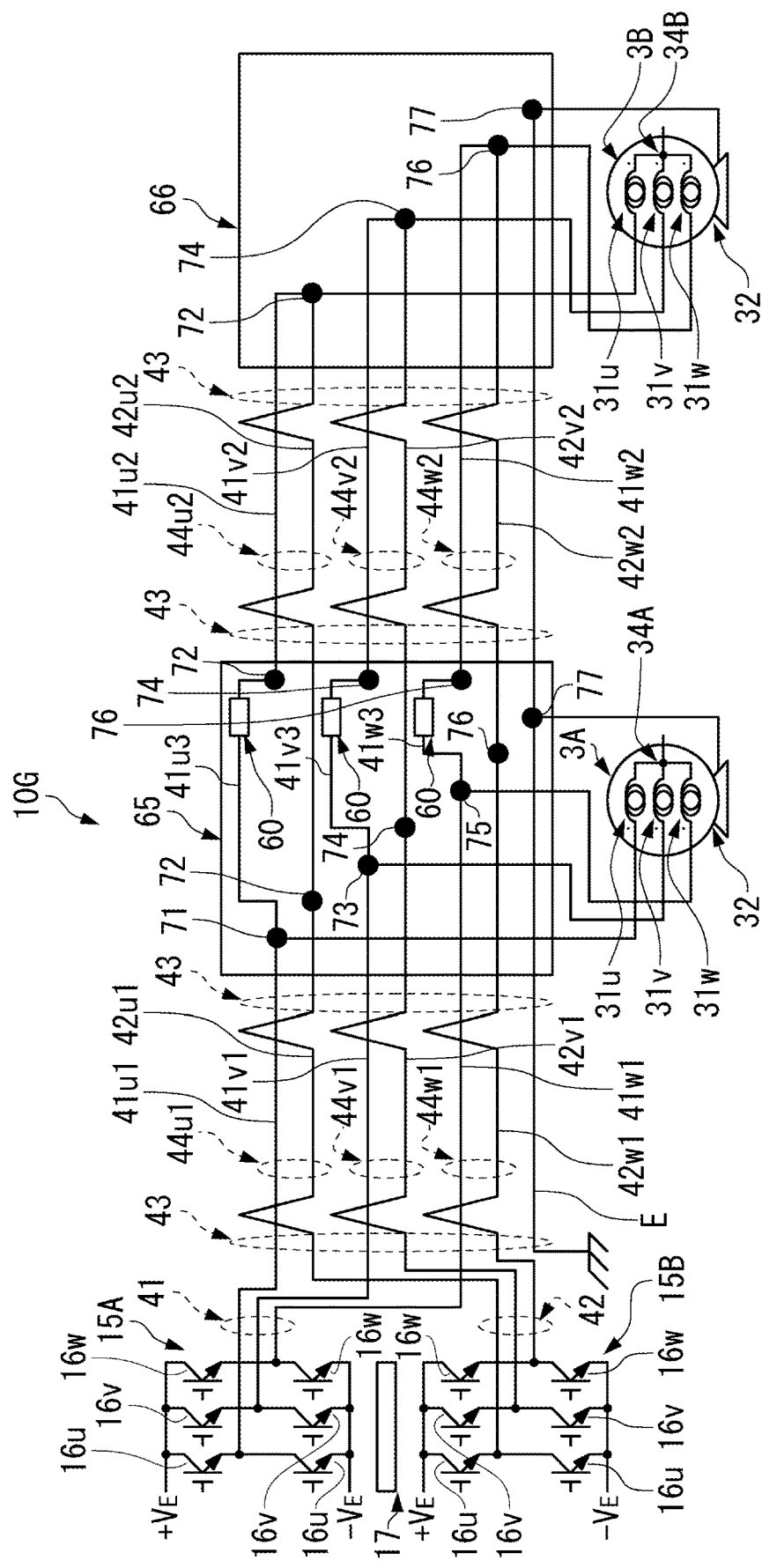
FIG. 14 is a block diagram of a motor driving device according to Embodiment 8 of the present invention.

In the driving device 10G in FIG. 14, the U-phase line 41u1 and the U-phase line 41u2 are connected by a U-phase line 41u3, the V-phase line 41v1 and the V-phase line 41v2 are connected by a V-phase line 41v3, and the W-phase line 41w1 and the W-phase line 41w2 are connected by a W-phase line 41w3. The U-phase line 41u1 and the U'-phase line 42u1 are connected by a U-phase extension line including the U-phase line 41u2 and the U-phase line 41u3. The V-phase line 41v1 and the V'-phase line 42v1 are connected by a V-phase extension line including the V-phase line 41v2 and the V-phase line 41v3. The W-phase line 41w1 and the W'-phase line 42w1 are connected by a W-phase extension line including the W-phase line 41w2 and the W-phase line 41w3.

In the driving device 10G, the U-phase line 41u2 and the U'-phase line 42u2 meet and are connected to the coil 31u of the second motor 3B, the V-phase line 41v2 and the V'-phase line 42v2 meet and are connected to the coil 31v of the second motor 3B, and the W-phase line 41w1 and the W'-phase line 42w2 meet and are connected to the coil 31w of the second motor 3B.

In the driving device 10G, the balanced line 44u2, 44v2, 44w2 extend from the first motor 3A to the second motor 3B. The balanced line 44u2 include a combination of the U-phase line 41u2, the U-phase line 41u3, and the U'-phase line 42u2. The balanced line 44v2 include a combination of the V-phase line 41v2, the V-phase line 41v3, and the V'-phase line 42v2. The balanced line 44w2 include a combination of the W-phase line 41w2, the W-phase line 41w3, and the W'-phase line 42w2.

The impedance circuit 60 is provided in each of the U-phase line 41u3, the V-phase line 41v3, and the W-phase line 41w3. The U-phase line 41u3, the V-phase line 41v3, and the W-phase line 41w3 are arranged in the first terminal block 65 corresponding to the first motor 3A, and thus the impedance circuit 60 is mounted on the side of the first motor 3A.

Figure 15:
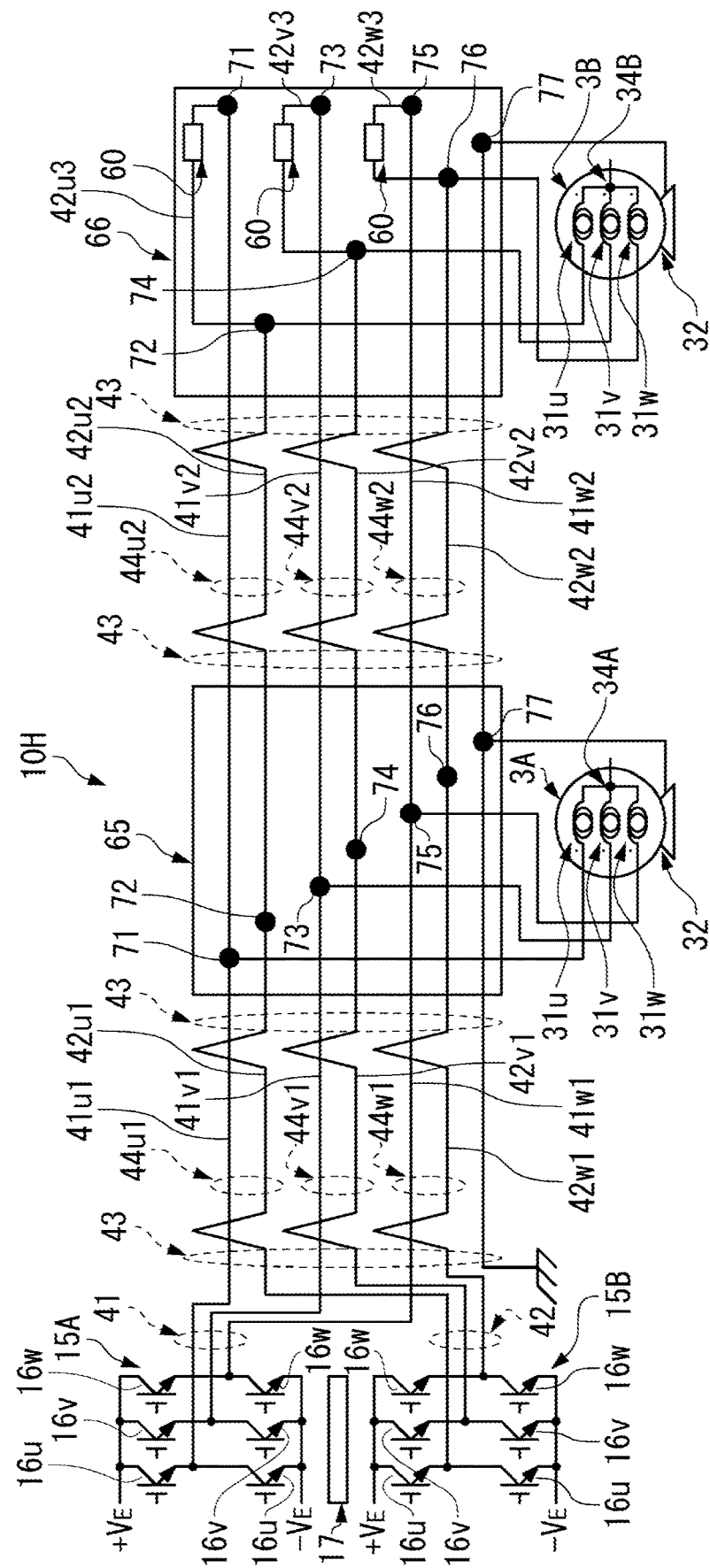
FIG. 15 is a block diagram of another motor driving device according to Embodiment 8 of the present invention.

In the driving device 10H in FIG. 15, the U-phase line 41u2 extends from the U-phase terminal 71 in the first terminal block 65 to the U-phase terminal 71 in the second terminal block 66, and the U-phase terminal 71 and the U'-phase terminal 72 in the second terminal block 66 are connected by a U'-phase line 42u3. In the driving device 10H, the V-phase line 41v2 extends from the V-phase terminal 73 in the first terminal block 65 to the V-phase terminal 73 in the second terminal block 66, and the V-phase terminal 73 and the V'-phase terminal 74 in the second terminal block 66 are connected by a V'-phase line 42v3. In the driving device 10H, the W-phase line 41w2 extends from the W-phase terminal 75 in the first terminal block 65 to the W-phase terminal 75 in the second terminal block 66, and the W-phase terminal 75 and the W'-phase terminal 76 in the second terminal block 66 are connected by a W'-phase line 42w3.

In the driving device 10H, the balanced line 44u2, 44v2, 44w2 extend from the first motor 3A to the second motor 3B. The impedance circuit 60 is provided in each of the U'-phase line 42u3, the V'-phase line 42v3, and the W'-phase line 42w3. The U'-phase line 42u3, the V'-phase line 42v3, and the W'-phase line 42w3 are arranged in the second terminal block 66 corresponding to the second motor 3B, and thus the impedance circuit 60 is mounted on the side of the second motor 3B.

Next, effects of Embodiment 8-2 will be described.

The balanced line 44$u$1, 44$v$1, 44$w$1, 44$u$2, 44$v$2, 44$w$2 all have the same characteristic impedance (RP). Thus, even if the U-phase line 41$u$ and the U'-phase line 42$u$, the V-phase line 41$v$ and the V'-phase line 42$v$, and the W-phase line 41$w$ and the W-phase line 42$w$ have different lengths and cannot be directly paired, impedance matching can be achieved.

Embodiment 8-3 (Driving Device 10I)

Figure 16:
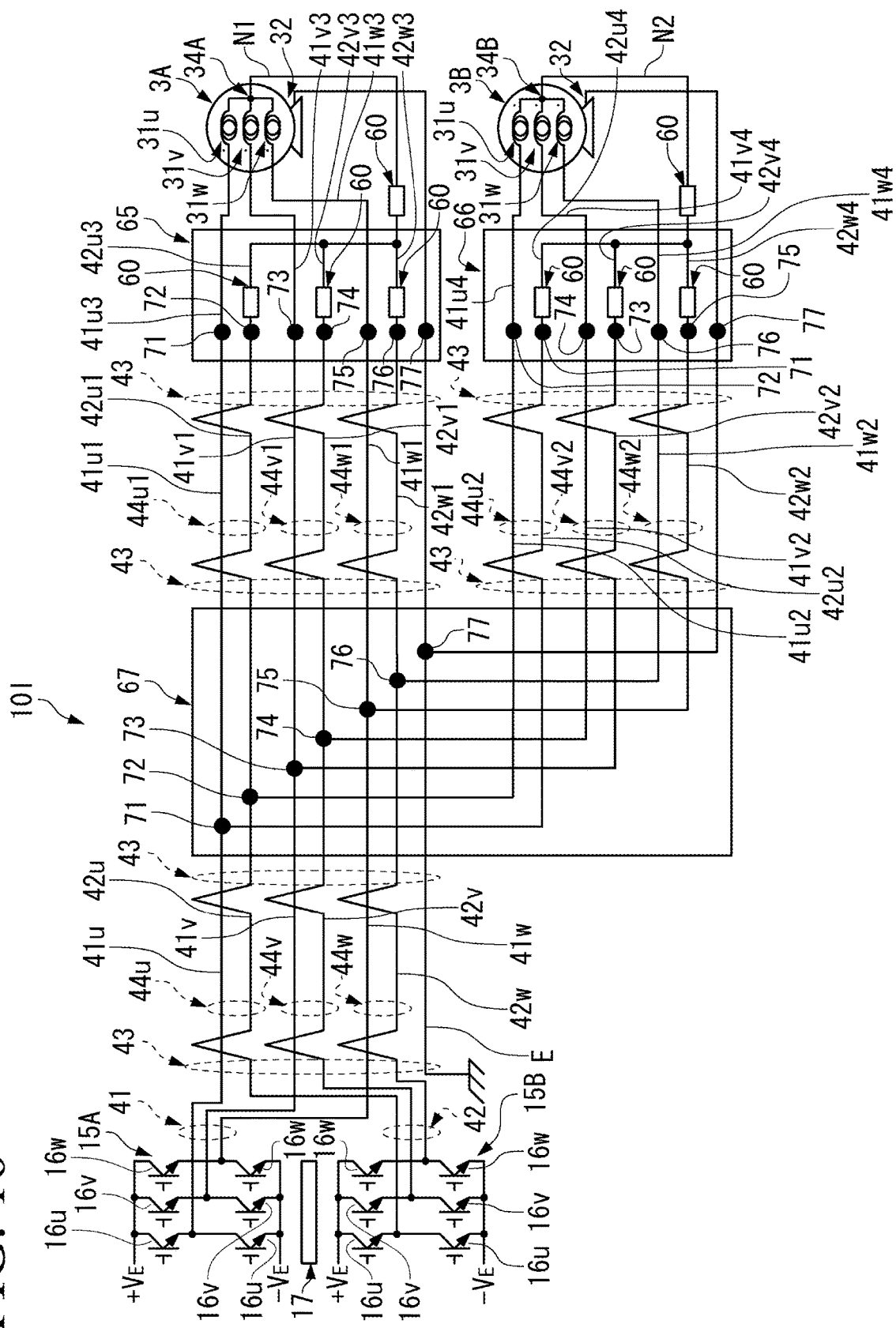
FIG. 16 is a block diagram of a further motor driving device according to Embodiment 8 of the present invention.

As shown in FIG. 16, in a driving device 10I according to Embodiment 8-3, the first motor 3A and the second motor 3B are connected in parallel to the inverter circuit 15A and the inverter circuit 15B. The same applies to Embodiment 8-4. The balanced line 44$u$, 44$v$, 44$w$ branch into two. Driving current is supplied through one balanced line 44$u$1, 44$v$1, 44$w$1 (first branch parallel lines) to the first motor 3A, and the driving current is supplied through the other balanced line 44$u$2, 44$v$2, 44$w$2 (second branch parallel lines) to the second motor 3B. When such branch wiring of the first motor 3A and the second motor 3B is needed, impedances of the balanced line 44$u$, 44$v$, 44$w$ before branching and impedances of the balanced line 44$u$1, 44$v$1, 44$w$1, 44$u$2, 44$v$2, 44$w$2 after branching are matched. The positions of the impedance circuits 60 in the driving device 10I are based on those in Embodiment 1-1.

The balanced line 44$u$ include the U-phase line 41$u$ and the U-phase line 42$u$, the balanced line 44$v$ include the V-phase line 41$v$ and the V-phase line 42$v$, and the balanced line 44$w$ include the W-phase line 41$w$ and the line 42$w$.

The U-phase line 41$u$ branches into the U-phase line 41$u$1 and the U-phase line 42$u$2, the U-phase line 42$u$ branches into the U-phase line 42$u$1 and the U-phase line 41$u$2, the V-phase line 41$v$ branches into the V-phase line 41$v$1 and the V-phase line 42$v$2, and the V-phase line 42$v$ branches into the V-phase line 42$v$1 and the V-phase line 41$v$2. The W-phase line 41$w$ branches into the W-phase line 41$w$1 and the W-phase line 42$w$2, and the W-phase line 42$w$ branches into the W-phase line 42$w$1 and the W-phase line 41$w$2. The lines branch in a branch terminal block 67.

The U-phase line 41$u$3 is connected to the U-phase line 41$u$1, the U-phase line 42$u$3 is connected to the U-phase line 42$u$1, the V-phase line 41$v$3 is connected to the V-phase line 41$v$1, the V-phase line 42$v$3 is connected to the V-phase line 42$v$1, the W-phase line 41$w$3 is connected to the W-phase line 41$w$1, and the W-phase line 42$w$3 is connected to the W-phase line 42$w$1. The lines are connected in the first terminal block 65. The U-phase line 41$u$3, the V-phase line 41$v$3, and the W-phase line 41$w$3 are connected to the coils 31$u$, 31$v$, 31$w$, respectively, of the first motor 3A. The U-phase line 42$u$3, the V-phase line 42$v$3, and the W-phase line 41$w$3 meet and are connected to the first neutral line N1. The impedance circuit 60 is provided in each of the U-phase line 42$u$3, the V-phase line 42$v$3, and the W-phase line 42$w$3, and the impedance circuit 60 is also provided in the first neutral line N1.

An U-phase line 41$u$4 is connected to the U-phase line 41$u$2, a U-phase line 42$u$4 is connected to the U-phase line 42$u$2, a V-phase line 41$v$4 is connected to the V-phase line 41$v$2, a V-phase line 42$v$4 is connected to the V-phase line 42$v$2, a W-phase line 41$w$4 is connected to the W-phase line 41$w$2, and a W-phase line 42$w$4 is connected to the W-phase line 42$w$2. The lines are connected in the second terminal block 66. The U-phase line 41$u$4, the V-phase line 41$v$4, and the W-phase line 41$w$4 are connected to the coils 31$u$, 31$v$, 31$w$, respectively, of the second motor 3B. The U-phase line 42$u$4, the V-phase line 42$v$4, and the W-phase line 42$w$4 meet and are connected to the second neutral line N2. The impedance circuit 60 is provided in each of the U-phase line 42$u$4, the V-phase line 42$v$4, and the W-phase line 41$w$4, and the impedance circuit 60 is also provided in the second neutral line N2.

As described above, in the driving device 10I, the balanced line 44$u$1, 44$v$1, 44$w$1 extend from the branch terminal block 67 to the first motor 3A, and the balanced line 44$u$2, 44$v$2, 44$w$2 extend from the branch terminal block 67 to the second motor 3B. The impedance circuit 60 is provided in each of the U-phase line 42$u$3 of the balanced line 44$u$1, the V-phase line 42$v$3 of the balanced line 44$v$1, and the W-phase line 42$w$3 of the balanced line 44$w$1. The impedance circuit 60 is provided in each of the U-phase line 42$u$4 of the balanced line 44$u$2, the V-phase line 42$v$4 of the balanced line 44$v$2, and the W-phase line 42$w$4 of the balanced line 44$w$2.

Next, effects of Embodiment 8-3 will be described.

Characteristic impedances of the balanced line 44$u$, 44$v$, 44$w$ before branching can be Rp/2, and the balanced line 44$u$1, 44$v$1, 44$w$1, 44$u$2, 44$v$2, 44$w$2 can all have the same characteristic impedance Rp after branching. Thus, even if the U-phase line 41$u$ and the U'-phase line 42$u$, the V-phase line 41$v$ and the V'-phase line 42$v$, and the W-phase line 41$w$ and the W-phase line 42$w$ branch midway and cannot be directly paired, impedance matching can be achieved.

Embodiment 8-4 (Driving Device 10J)

Figure 17:
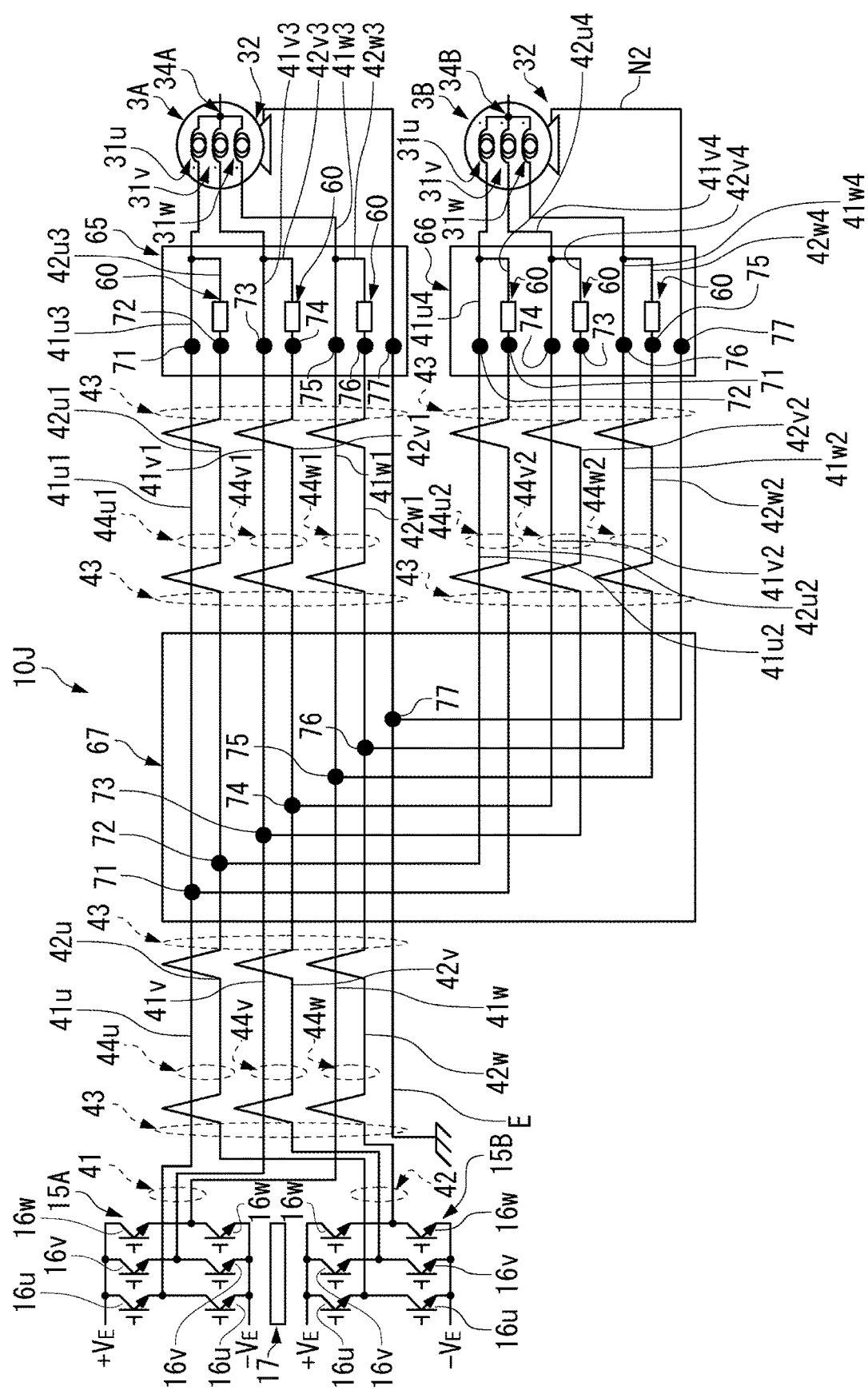
FIG. 17 is a block diagram of a further motor driving device according to Embodiment 8 of the present invention.

As shown in FIG. 17, also in a driving device 10J according to Embodiment 8-4, the balanced line 44$u$, 44$v$, 44$w$ branch into two. Driving current is supplied through one balanced line 44$u$1, 44$v$1, 44$w$1 to the first motor 3A, and the driving current is supplied through the other balanced line 44$u$2, 44$v$2, 44$w$2 to the second motor 3B. When such branch wiring of the first motor 3A and the second motor 3B is needed, impedances of the balanced line 44$u$, 44$v$, 44$w$ before branching and impedances of the balanced line 44$u$1, 44$v$1, 44$w$1, 44$u$2, 44$v$2, 44$w$2 after branching are matched. The positions of the impedance circuits 60 in the driving device 10I are based on those in Embodiment 1-2.

The driving device 10J is different from the driving device 10I in a connection state of the U-phase line 41$u$3, the U-phase line 42$u$3, the V-phase line 41$v$3, the V-phase line 42$v$3, the W-phase line 41$w$3, and the W-phase line 42$w$3 to the first motor 3A. The driving device 10J is also different from the driving device 10I in a connection state of the U-phase line 41$u$4, the U-phase line 42$u$4, the V-phase line 41$v$4, the V-phase line 42$v$4, the W-phase line 41$w$4, and the W-phase line 42$w$4 to the second motor 3B. The differences will be described below.

The U-phase line 41$u$3 is connected to the coil 31$u$ of the first motor 3A, the V-phase line 41$v$3 is connected to the coil 31V of the first motor 3A, and the W-phase line 41$w$3 is connected to the coil 31$w$ of the first motor 3A. The U-phase line 42$u$3 meets the U-phase line 41$u$3, the V-phase line 42$v$3 meets the V-phase line 41$v$3, and the W-phase line 42$w$3 meets the W-phase line 41$w$3. The impedance circuit 60 is provided in each of the U-phase line 42$u$3, the V-phase line 42$v$3, and the W-phase line 42$w$3.

The U-phase line 41$u$4 is connected to the coil 31$u$ of the second motor 3B, the V-phase line 41$v$4 is connected to the coil 31$v$ of the second motor 3B, and the W-phase line 41$w$4 is connected the coil 31$w$ of the second motor 3B. The U-phase line 42u4 meets the U-phase line 41u4, the V-phase line 42v4 meets the V-phase line 41v4, and the W-phase line 42w4 meets the W-phase line 41w4. The impedance circuit 60 is provided in each of the U-phase line 42u4, the V-phase line 42v4, and the W-phase line 42w4.

As described above, in the driving device 10J, the balanced line 44u1, 44v1, 44w1 extend from the branch terminal block 67 to the first motor 3A, and the balanced line 44u2, 44v2, 44w2 extend from the branch terminal block 67 to the second motor 3B. The impedance circuit 60 is provided in each of the U'-phase line 42u3 of the balanced line 44u1, the V'-phase line 42v3 of the balanced line 44v1, and the W'-phase line 42w3 of the balanced line 44w1. The impedance circuit 60 is provided in each of the U'-phase line 42u4 of the balanced line 44u2, the V'-phase line 42v4 of the balanced line 44v2, and the W'-phase line 42w4 of the balanced line 44w2.

In Embodiment 8-4, as in Embodiment 8-3, even if the U-phase line 41u and the U'-phase line 42u, the V-phase line 41v and the V'-phase line 42v, and the W-phase line 41w and the W-phase line 42w branch midway and cannot be directly paired, impedance matching can be achieved.

Embodiment 9

Next, with reference to FIGS. 18 to 20, Embodiment 9 according to the present invention will be described. In Embodiment 9, a specific wiring example of the balanced line is described. Embodiment 9 includes Embodiment 9-1 to Embodiment 9-4.

Embodiment 9-1

Figure 18A:
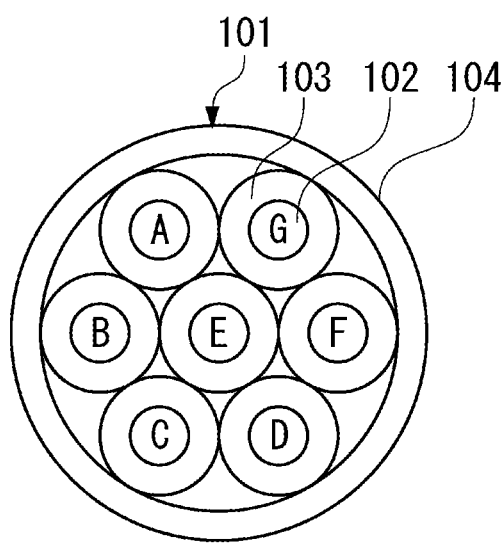
FIG. 18 shows an example of a section of a multicore cable according to Embodiment 9 of the present invention.

As shown in FIG. 18A, a multicore cable 101 (the core is a conductor) according to Embodiment 9-1 includes seven cores: a core A, a core B, a core C, a core D, a core E, a core F, and a core G. In the multicore cable 101, the core A, the core B, the core C, the core D, the core E, the core F, and the core G each include a conductor 102 and an insulator 103 covering the conductor 102. The multicore cable 101 includes a sheath 104 covering the core A, the core B, the core C, the core D, the core E, the core F, and the core G. The conductor 102 may be a stranded wire, a compression conductor, a single wire, or the like. The insulator 103 is made of polyvinyl chloride (PVC), polytetrafluoroethylene (PTFE), polyethylene (PE), expanded polyethylene, or the like. The sheath 104 is made of a material similar to that of the insulator 103. The multicore cable 101 including the sheath 104 has a preferred configuration for forming the balanced line according to the present invention, and only the core A, the core B, the core C, the core D, the core E, the core F, and the core G can form the balanced line without the sheath 104 in the present invention. This configuration of the multicore cable 101 applies to multicore cables 101 described later.

In the multicore cable 101, the core A and the core B are paired, the core C and the core D are paired, and the core F and the core G are paired to form balanced line. With the U-phase line 41u, the U'-phase line 42u, the V-phase line 41v, the V'-phase line 42v, the W-phase line 41w, the W'-phase line 42w, and the ground wire E as in Embodiment 1-1, the cores can be assigned as described below:

The core A is the U-phase line 41u, the core B is the U'-phase line 42u, the core C is the V-phase line 41v, the core D is the V'-phase line 42v, the core E is the ground wire E, the core F is the W-phase line 41w, and the core G is the W'-phase line 42w.

In a preferred multicore cable 101, each pair of the lines in the first power line 41 and the second power line 42 are stranded, and the pairs have different stranding pitches. For example, when P1 is a pitch of the U-phase line 41u and the U'-phase line 42u, P2 is a pitch of the V-phase line 41v and the V'-phase line 42v, and P3 is a pitch of the W-phase line 41w and the W-phase line 42w, P1 is not equal to P2, and P2 is not equal to P3, and P3 is not equal to P1.

Figure 18B:
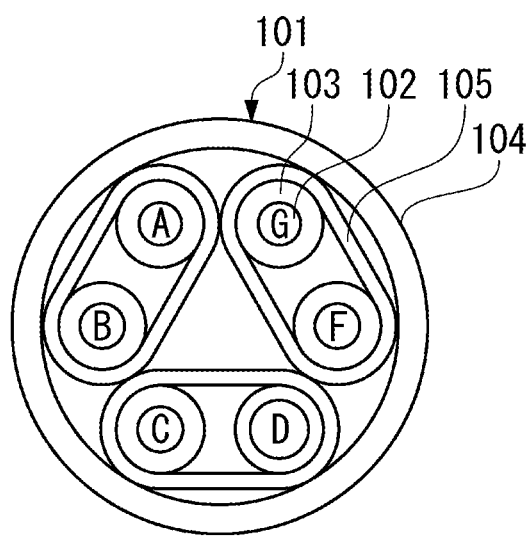

Further, as shown in FIG. 18B, an electromagnetic shield 105 preferably covers each pair. The electromagnetic shield 105 may replace the ground wire E (core E), and in that case, the ground wire E may be omitted. The electromagnetic shield 105 is constituted by a combination of a conductor and a magnetic material.

With the multicore cable 101 according to Embodiment 9-1, an intended characteristic impedance can be provided over the entire length of the multicore cable 101. Also, crosstalk due to induction voltage or induction current generated between the lines forming the balanced line can be reduced. Comparing the multicore cable 101 in FIG. 18A and the multicore cable 101 in FIG. 18B, crosstalk in the latter is lower.

Embodiment 9-2

Figure 18C:
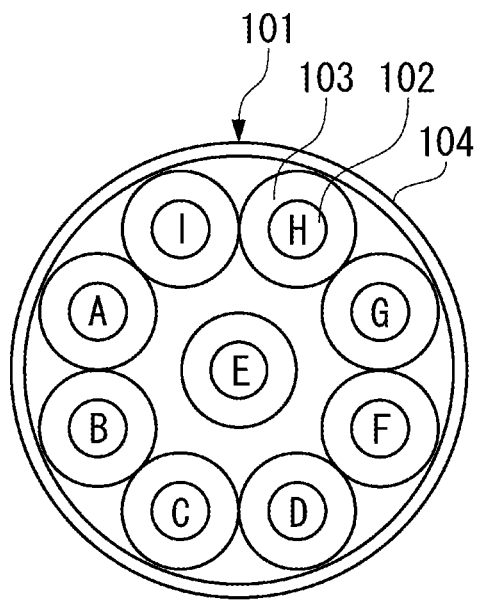

As shown in FIG. 18C, a multicore cable 101 according to Embodiment 9-2 includes nine cores: a core A, a core B, a core C, a core D, a core E, a core F, a core G, a core H, and a core I. Specifically, the multicore cable 101 includes two more wires: the core H and the core I than the multicore cable 101 according to Embodiment 9-1.

In the multicore cable 101, the core A and the core B are paired, the core C and the core D are paired, the core F and the core G are paired, and the core H and the core I are paired to form balanced line. A characteristic impedance of the pair of the core H and the core I is one third of that of the pair of the core A and the core B, that of the pair of the core C and the core D, and that of the pair of the core F and the core G.

With the U-phase line 41u, the U'-phase line 42u, the V-phase line 41v, the V'-phase line 42v, the W-phase line 41w, the W'-phase line 42w, the ground wire E, the first neutral line N1, and the second neutral line N2 as in Embodiment 1-1 of Embodiment 1, the cores can be assigned as described below:

The core A is the U-phase line 41u, the core B is the U'-phase line 42u, the core C is the V-phase line 41v, the core D is the V'-phase line 42v, the core E is the ground wire E, the core F is the W-phase line 41w, the core G is the W'-phase line 42w, the core H is the first neutral line N1, and the core I is the second neutral line N2.

Figure 18D:
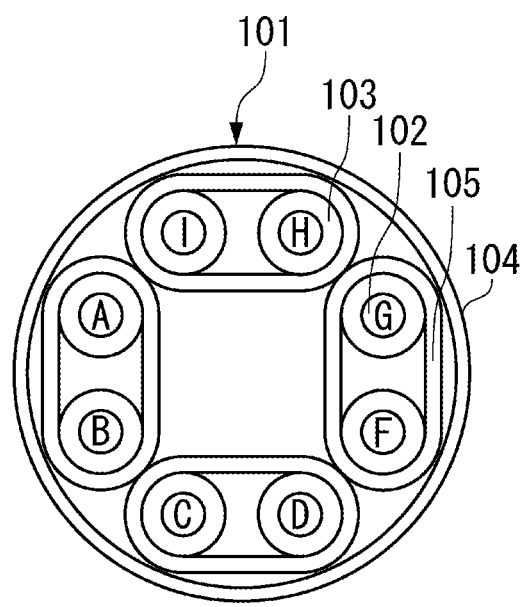

Also in Embodiment 9-2, in a preferred multicore cable 101, each pair of the lines are stranded, and the pairs have different stranding pitches. Also, as shown in FIG. 18D, an electromagnetic shield 105 covers each pair.

Also in the multicore cable 101 according to Embodiment 9-2, an intended characteristic impedance can be provided over the entire length of the multicore cable 101. Also, crosstalk due to induction voltage or induction current generated between the lines forming the balanced line can be reduced. Comparing the multicore cable 101 in FIG. 18C and the multicore cable 101 in FIG. 18D, crosstalk in the latter is lower.

Embodiment 9-3

Figure 19A:
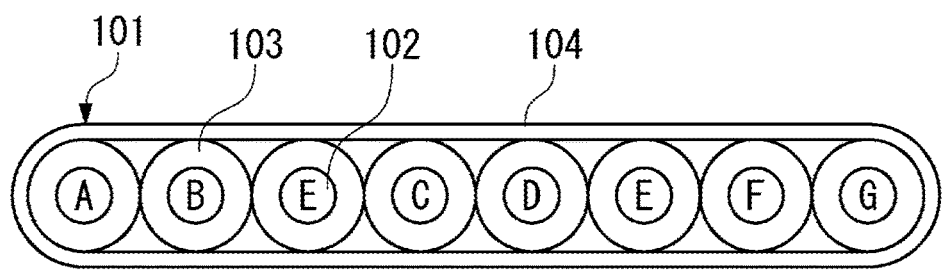
FIG. 19 shows an example of a section of a flat cable according to Embodiment 9 of the present invention.

As shown in FIG. 19A, a multicore cable 101 according to Embodiment 9-3 includes eight cores: a core A, a core B, a core E, a core C, a core D, a core E, a core F, and a core G, and has a flat shape.

In the multicore cable 101, the core A and the core B are paired, the core C and the core D are paired, and the core F and the core G are paired to form balanced line. With the U-phase line 41u, the U'-phase line 42u, the V-phase line 41v, the V'-phase line 42v, the W-phase line 41w, the W'-phase line 42w, and the ground wire E as in Embodiment 1-1, the cores can be assigned as described below:

The core A is the U-phase line 41u, the core B is the U'-phase line 42u, the core C is the V-phase line 41v, the core D is the V'-phase line 42v, the core E is the ground wire E, the core F is the W-phase line 41w, and the core G is the W'-phase line 42w.

Figure 19B:
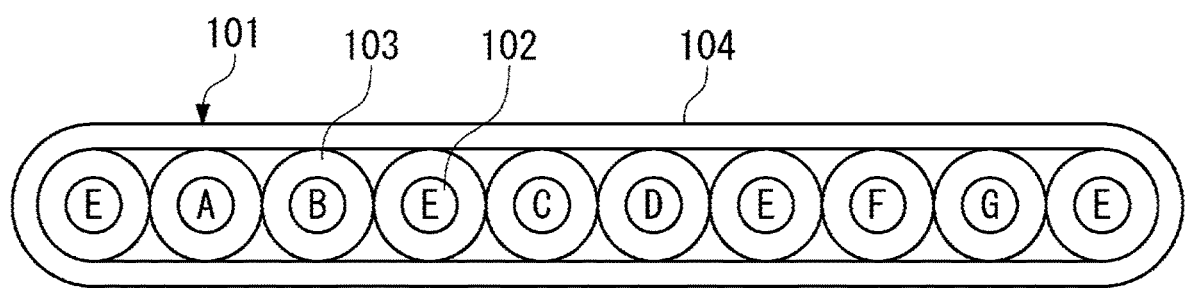

Also in Embodiment 9-3, in a preferred multicore cable 101, each pair of the lines are stranded, and the pairs have different stranding pitches. Also, as shown in FIG. 19B, two cores E are added as ground wires, and arranged symmetrically with respect to a middle in a width direction.

Figure 19C:
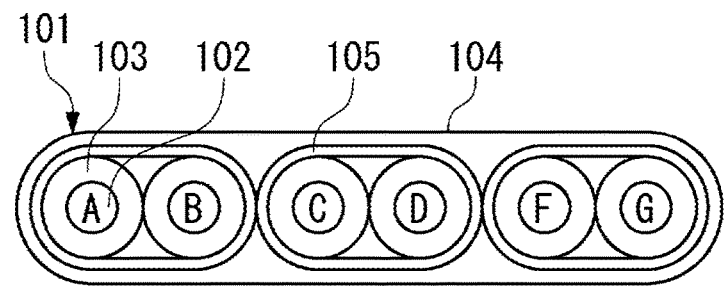

As shown in FIG. 19C, in another preferred multicore cable 101, an electromagnetic shield 105 covers each pair. The electromagnetic shield 105 may replace the ground wire E (core E), and in that case, the ground wire E may be omitted.

With the multicore cable 101 according to Embodiment 9-3, an intended characteristic impedance can be provided over the entire length of the multicore cable 101. Also, crosstalk due to induction voltage or induction current generated between the lines forming the balanced line can be reduced. Comparing the multicore cable 101 in FIG. 19A, the multicore cable 101 in FIG. 19B, and the multicore cable 101 in FIG. 19C, crosstalk decreases in the order of FIG. 19A, FIG. 19B, and FIG. 19C.

Embodiment 9-4

Figure 20A:
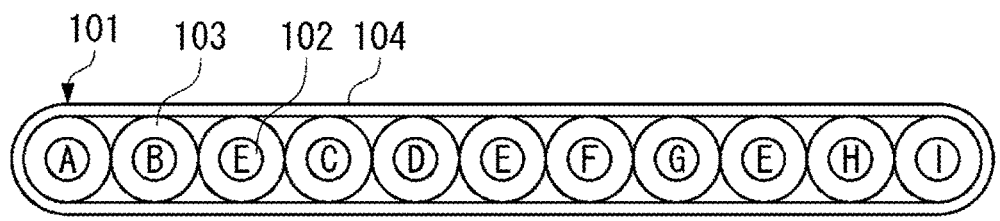
FIG. 20 shows an example of a section of another flat cable according to Embodiment 9 of the present invention.

As shown in FIG. 20A, a multicore cable 101 according to Embodiment 9-4 includes eleven cores: a core A, a core B, a core E, a core C, a core D, a core E, a core F, a core G, a core E, a core H, and a core I. Specifically, the multicore cable 101 includes two more wires: the cores E than the multicore cable 101 according to Embodiment 9-2.

In the multicore cable 101, the core A and the core B are paired, the core C and the core D are paired, the core F and the core G are paired, and the core H and the core I are paired to form balanced line. A characteristic impedance of the pair of the core H and the core I is one third of that of the pair of the core A and the core B, that of the pair of the core C and the core D, and that of the pair of the core F and the core G.

With the U-phase line 41u, the U'-phase line 42u, the V-phase line 41v, the V'-phase line 42v, the W-phase line 41w, the W'-phase line 42w, the ground wire E, the first neutral line N1, and the second neutral line N2 as in Embodiment 1-1 of Embodiment 1, the cores can be assigned as described below:

The core A is the U-phase line 41u, the core B is the U'-phase line 42u, the core C is the V-phase line 41v, the core D is the V'-phase line 42v, the core F is the W-phase line 41w, the core G is the W'-phase line 42w, the core E is the ground wire E, the core H is the first neutral line N1, and the core I is the second neutral line N2.

Figure 20B:
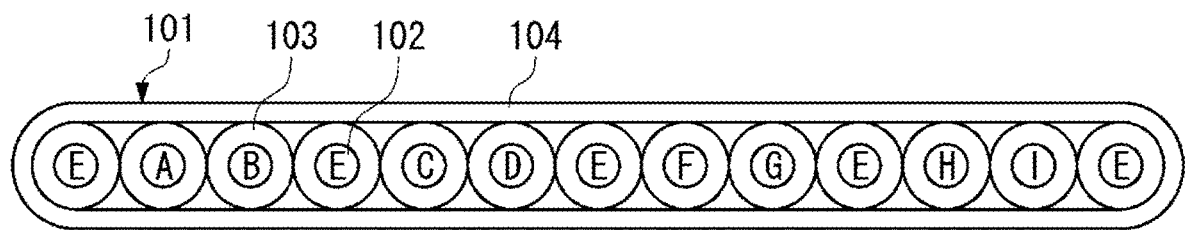

In a preferred multicore cable 101, each pair of the lines in the first power line 41 and the second power line 42 are stranded, and the pairs have different stranding pitches. Further, as shown in FIG. 20B, two cores E are added as ground wires, and arranged symmetrically with respect to a middle in a width direction.

Figure 20C:
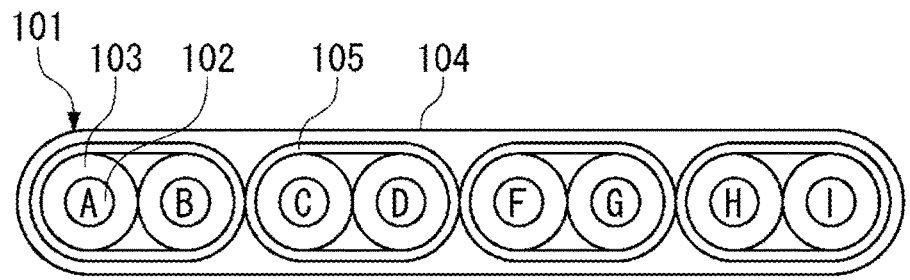

As shown in FIG. 20C, in another preferred multicore cable 101, an electromagnetic shield 105 covers each pair. The electromagnetic shield 105 may replace the ground wire E (core E), and in that case, the ground wire E may be omitted.

With the multicore cable 101 according to Embodiment 9-4, an intended characteristic impedance can be provided over the entire length of the multicore cable 101. Also, crosstalk due to induction voltage or induction current generated between the lines forming the balanced line can be reduced. Comparing the multicore cable 101 in FIG. 20A, the multicore cable 101 in FIG. 20B, and the multicore cable 101 in FIG. 20C, crosstalk decreases in the order of FIG. 20A, FIG. 20B, and FIG. 20C.

The preferred embodiments of the present invention have been described, but the configurations in the embodiments may be chosen or changed to other configurations without departing from the gist of the present invention.

For example, the balanced line (including stranded wires) such that one transmission line is arranged simply in parallel to the other transmission line have been described as the example of the transmission lines in the present invention. However, the transmission lines in the present invention may be arranged adjacent to each other so that an electromagnetic field (electric or magnetic field) generated from one line cancels out with an electromagnetic field generated from the other line. For example, other than the balanced line, the following transmission lines are acceptable, through which equal or approximate currents in opposite directions can flow and which are arranged adjacent to each other.

Coaxial configuration: around one transmission line, the other transmission line is concentrically provided.

Microstrip configuration, parallel flat configuration: one transmission line is provided on one side, and the other transmission line is provided on the other side, with an insulating layer between the sides.

Strip configuration: one transmission line is sandwiched between the other transmission lines via insulating layers.

Slot configuration, coplanar configuration, etc.: one transmission line and the other transmission line are provided on the same side.

REFERENCE SIGNS LIST 3 motor
3A first motor
3B second motor
10, 10A, 10B, 10C, 10D, 10E, 10F, 10G, 10H, 10I, 10J driving device
11A first power source
11B second power source
13A first converter
13B second converter
15A first inverter circuit
15B second inverter circuit
16U, 16v, 16W semiconductor switching element
17 inverter control unit
31, 31u, 31v, 31w coil
32 stator
34A first neutral point
34B second neutral point
41 first power line
42 second power line
41u, 41u1, 41u2, 41u3, 41u4 U-phase line
41v, 41v1, 41v2, 41v3, 41v4 V-phase line
41w, 41w1, 41w2, 41w3, 41w4 W-phase line
42u, 42u1, 42u2, 42u3, 42u4 U'-phase line 42v, 42v1, 42v2, 42v3, 42v4 V'-phase line
42w, 42w1, 42w2, 42w3, 42w4 W'-phase line
43 multicore cable
44u, 44v, 44w balanced line (transmission line)
44u1, 44v1, 44w1 balanced line (transmission line)
44u2, 44v2, 44w2 balanced line (transmission line)
45 balanced line (transmission line)
51, 60, 60A, 60B, 60C impedance circuit
52, 53, 54 rejection filter
55, 56, 57 bypass filter
58, 58A, 58B, 58C bidirectional switch
65 first terminal block
66 second terminal block
67 branch terminal block
71 U-phase terminal
72 U'-phase terminal
73 V-phase terminal
74 V'-phase terminal
75 W-phase terminal
76 W'-phase terminal
77 ground terminal
79 branch terminal
91 three-phase common mode choke coil
92 two-phase common mode choke coil
101 multicore cable
102 conductor
103 insulator
104 sheath
105 electromagnetic shield
A receiving end
C capacitor
E ground wire
L inductor
N1 neutral line
N2 neutral line

What is claimed is:

1. A motor driving device comprising:
a first motor and a second motor driven by three-phase AC power;
a first power line including a U-phase line, a V-phase line, and a W-phase line for supplying driving power to the first motor;
a second power line including a U'-phase line, a V'-phase line, and a W'-phase line for supplying driving power to the second motor;
a first inverter circuit configured to supply the driving power to the first power line;
a second inverter circuit configured to supply the driving power to the second power line;
transmission lines including a pair of the U-phase line and the U'-phase line, a pair of the V-phase line and the V'-phase line, and a pair of the W-phase line and the W'-phase line; and
an impedance circuit impedance-matched to the transmission lines,
each of the transmission lines being arranged via an insulator, wherein
the second inverter circuit and the first inverter circuit perform control to apply voltages of opposite phases to each of the pair of the U-phase line and the U'-phase line, the pair of the V-phase line and the V'-phase line, and the pair of the W-phase line and the W'-phase line to pass currents in opposite directions through each of the pair of the U-phase line and the U'-phase line, the pair of the V-phase line and the V'-phase line, and the pair of the W-phase line and the W'-phase line, and to synchronously drive the first motor and the second motor.

2. A motor driving device comprising:
a first motor and a second motor driven by three-phase AC power;
a first power line including a U-phase line, a V-phase line, and a W-phase line for supplying driving power to the first motor;
a second power line including a U'-phase line, a V'-phase line, and a W'-phase line for supplying driving power to the second motor.
a first inverter circuit configured to supply the driving power to the first power line;
a second inverter circuit configured to supply the driving power to the second power line;
transmission lines including a pair of the U-phase line and the U'-phase line, a pair of the V-phase line and the V'-phase line, and a pair of the W-phase line and the W'-phase line; and
an impedance circuit impedance-matched to the transmission lines, each of the transmission lines being arranged via an insulator, wherein the impedance circuit is provided between a first neutral point of the first motor and a second neutral point of the second motor.

3. A motor driving device comprising:
a first motor and a second motor driven by three-phase AC power;
a first power line including a U-phase line, a V-phase line, and a W-phase line for supplying driving power to the first motor;
a second power line including a U'-phase line, a V'-phase line, and a W'-phase line for supplying driving power to the second motor;
a first inverter circuit configured to supply the driving power to the first power line;
a second inverter circuit configured to supply the driving power to the second power line;
transmission lines including a pair of the U-phase line and the U'-phase line, a pair of the V-phase line and the V'-phase line, and a pair of the W-phase line and the W'-phase line; and
an impedance circuit impedance-matched to the transmission lines,
each of the transmission lines being arranged via an insulator, wherein in a section connecting receiving ends of the first motor and the second motor and the transmission lines, the impedance circuit is provided to connect corresponding phases of the transmission lines.

4. A motor driving device comprising:
a first motor and a second motor driven by three-phase AC power;
a first power line including a U-phase line, a V-phase line, and a W-phase line for supplying driving power to the first motor;
a second power line including a U'-phase line, a V'-phase line, and a W'-phase line for supplying driving power to the second motor;
a first inverter circuit configured to supply the driving power to the first power line;
a second inverter circuit configured to supply the driving power to the second power line;
transmission lines including a pair of the U-phase line and the U'-phase line, a pair of the V-phase line and the V'-phase line, and a pair of the W-phase line and the W'-phase line; and an impedance circuit impedance-matched to the transmission lines, each of the transmission lines being arranged via an insulator, wherein a first drive shaft of the first motor and a second drive shaft of the second motor are shared.

5. The motor driving device according to claim 1, further comprising, as a loss reduction circuit, one or both of a rejection filter connected in series to the impedance circuit and a bypass filter connected in parallel to the impedance circuit.

6. The motor driving device according to claim 5, further comprising one or both of the rejection filter including a capacitor and an inductor connected in parallel and the bypass filter including the capacitor and the inductor connected in series.

7. The motor driving device according to claim 5, wherein in one or both of the rejection filter and the bypass filter, an inductor and a bidirectional switch are connected in series.

8. The motor driving device according to claim 5, further comprising a plurality of the loss reduction circuits having different characteristics corresponding to a plurality of the impedance circuits.

9. The motor driving device according to claim 2, wherein neutral lines connected to the first neutral point of the first motor and the second neutral point of the second motor and extended from the first neutral point and the second neutral point form the transmission lines, and the impedance circuit is provided in the transmission lines.

10. The motor driving device according to claim 3, further comprising:
    a main path including the transmission lines connecting the first inverter circuit and the first motor and the transmission lines connecting the second inverter circuit and the second motor; and
    a sub-path including the transmission lines branching off from the main path,
    the impedance circuit being provided in the sub-path.

11. The motor driving device according to claim 1, wherein the impedance circuit is provided between a first neutral point of the first motor and a second neutral point of the second motor.

12. The motor driving device according to claim 1, wherein in a section connecting receiving ends of the first motor and the second motor and the transmission lines, the impedance circuit is provided to connect corresponding phases of the transmission lines.

13. The motor driving device according to claim 1, wherein a first drive shaft of the first motor and a second drive shaft of the second motor are shared.

14. The motor driving device according to claim 1, further comprising, as a loss reduction circuit, one or both of a rejection filter connected in series to the impedance circuit and a bypass filter connected in parallel to the impedance circuit.

15. The motor driving device according to claim 2, further comprising, as a loss reduction circuit, one or both of a rejection filter connected in series to the impedance circuit and a bypass filter connected in parallel to the impedance circuit.

16. The motor driving device according to claim 4, wherein neutral lines connected to the first neutral point of the first motor and the second neutral point of the second motor and extended from the first neutral point and the second neutral point form the transmission lines, and the impedance circuit is provided in the transmission lines.

17. The motor driving device according to claim 4, further comprising:
    a main path including the transmission lines connecting the first inverter circuit and the first motor and the transmission lines connecting the second inverter circuit and the second motor; and
    a sub-path including the transmission lines branching off from the main path,
    the impedance circuit being provided in the sub-path.

* * * * *